United States Patent
Edgar

(10) Patent No.: US 9,508,125 B2
(45) Date of Patent: Nov. 29, 2016

(54) RESTORATION OF PHOTOGRAPHIC FILM HAVING A COLOR MATRIX USING DIGITAL PHOTOGRAPHIC FILM PROCESSING TECHNIQUES

(71) Applicant: Astral Images Corporation, Austin, TX (US)

(72) Inventor: Albert Durr Edgar, Austin, TX (US)

(73) Assignee: Astral Images Corporation, Austin, TX (US)

( * ) Notice: Subject to any disclaimer, the term of this patent is extended or adjusted under 35 U.S.C. 154(b) by 0 days.

(21) Appl. No.: 14/791,391

(22) Filed: Jul. 3, 2015

(65) Prior Publication Data

US 2016/0140694 A1  May 19, 2016

Related U.S. Application Data

(60) Provisional application No. 61/989,317, filed on May 6, 2014.

(51) Int. Cl.
| | |
|---|---|
| G06K 9/40 | (2006.01) |
| G06T 5/00 | (2006.01) |
| H04N 1/04 | (2006.01) |
| G06T 5/50 | (2006.01) |

(52) U.S. Cl.
CPC ............... *G06T 5/001* (2013.01); *G06T 5/50* (2013.01); *H04N 1/04* (2013.01); *G06T 2207/10048* (2013.01)

(58) Field of Classification Search
CPC ..... G06T 5/001; G06T 7/408; G06T 11/001; H04N 7/26148; H04N 7/26292; H04N 1/64; H04N 1/60; H04N 1/6058; H04N 9/045; H04N 1/04
See application file for complete search history.

(56) References Cited

U.S. PATENT DOCUMENTS

| | | | | |
|---|---|---|---|---|
| 5,995,650 A * | 11/1999 | Migdal | ............. | G01B 11/2518 345/419 |
| 6,380,539 B1 * | 4/2002 | Edgar | ................ | H04N 1/00795 250/339.05 |
| 6,677,936 B2 * | 1/2004 | Jacobsen | ............. | G02B 25/002 345/102 |
| 7,737,937 B2 * | 6/2010 | Fisekovic | ............. | G09G 3/342 345/102 |
| 8,036,450 B2 * | 10/2011 | Bertola | ............. | G05B 19/4099 356/606 |
| 8,335,025 B2 * | 12/2012 | King | ................ | H04N 1/02845 358/425 |
| 8,531,401 B2 * | 9/2013 | Chatow | ................ | G06F 3/0317 345/156 |

* cited by examiner

*Primary Examiner* — Amir Alavi
(74) *Attorney, Agent, or Firm* — David O. Simmons

(57) ABSTRACT

Embodiments of the present invention are directed to using digital photographic film processing techniques for restoration of photographic film having a color grid over an underlying silver film. More specifically, embodiments of the present invention improve the resolution and reduce the noise of images with color matrix dots for use with modern digital display technologies. In doing so, embodiments of the present invention advantageously overcome the adverse situation of color matrix dots in images being distracting when viewed directly, particularly in the case of the modern world of digital displays because displaying such a color matrix as is has previously not been practical on a digital display, however means of suppressing the dots in preparation for a digital display have produced low resolution and noisy images.

17 Claims, 23 Drawing Sheets

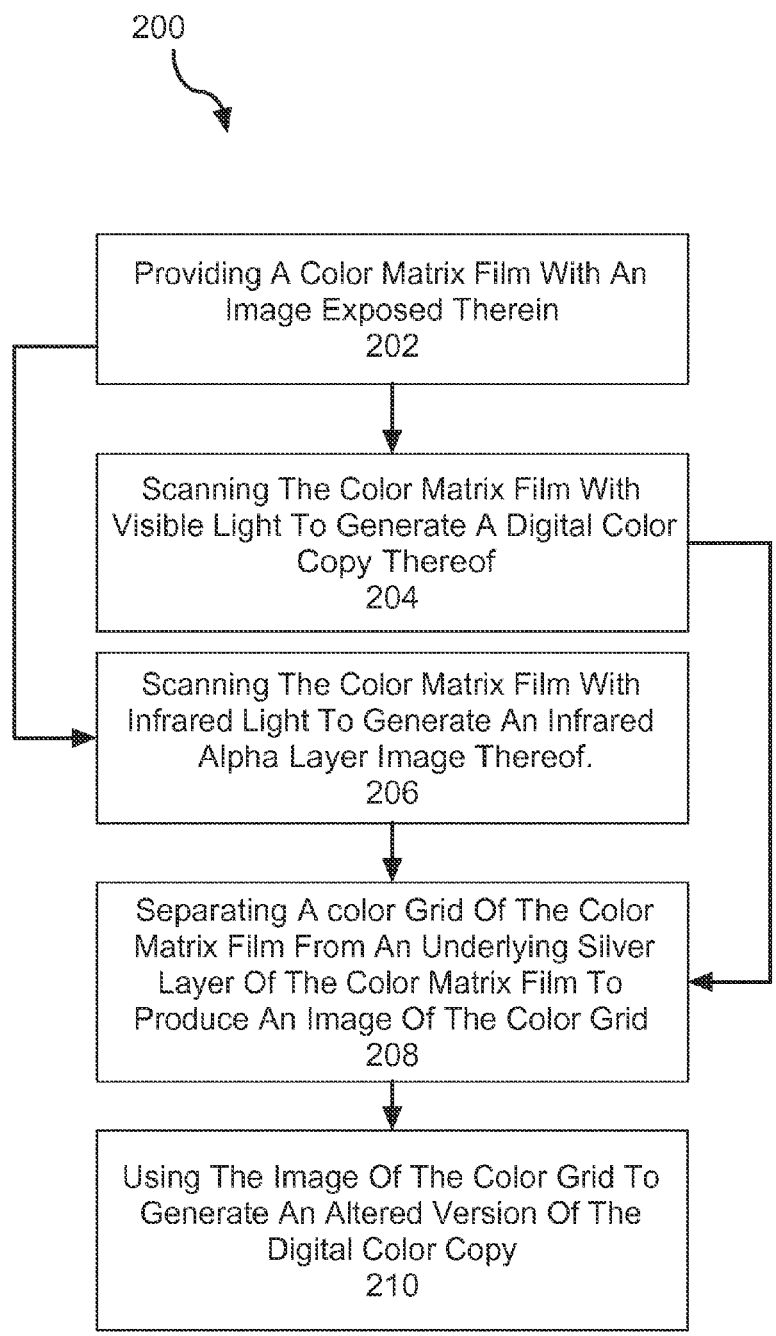

FIG. 4A

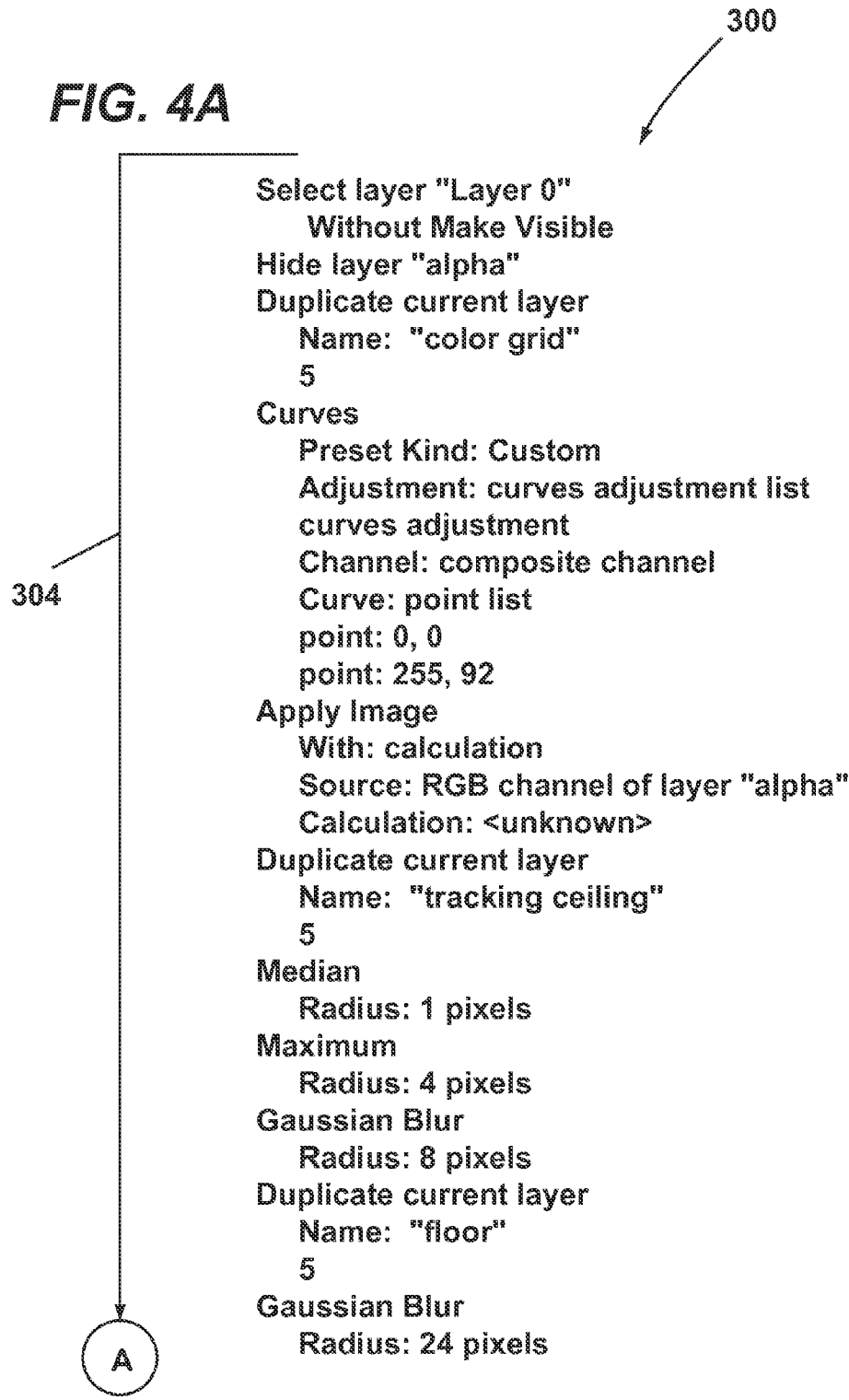

304

300

Select layer "Layer 0"
    Without Make Visible
Hide layer "alpha"
Duplicate current layer
    Name: "color grid"
    5
Curves
    Preset Kind: Custom
    Adjustment: curves adjustment list
    curves adjustment
    Channel: composite channel
    Curve: point list
    point: 0, 0
    point: 255, 92
Apply Image
    With: calculation
    Source: RGB channel of layer "alpha"
    Calculation: <unknown>
Duplicate current layer
    Name: "tracking ceiling"
    5
Median
    Radius: 1 pixels
Maximum
    Radius: 4 pixels
Gaussian Blur
    Radius: 8 pixels
Duplicate current layer
    Name: "floor"
    5
Gaussian Blur
    Radius: 24 pixels

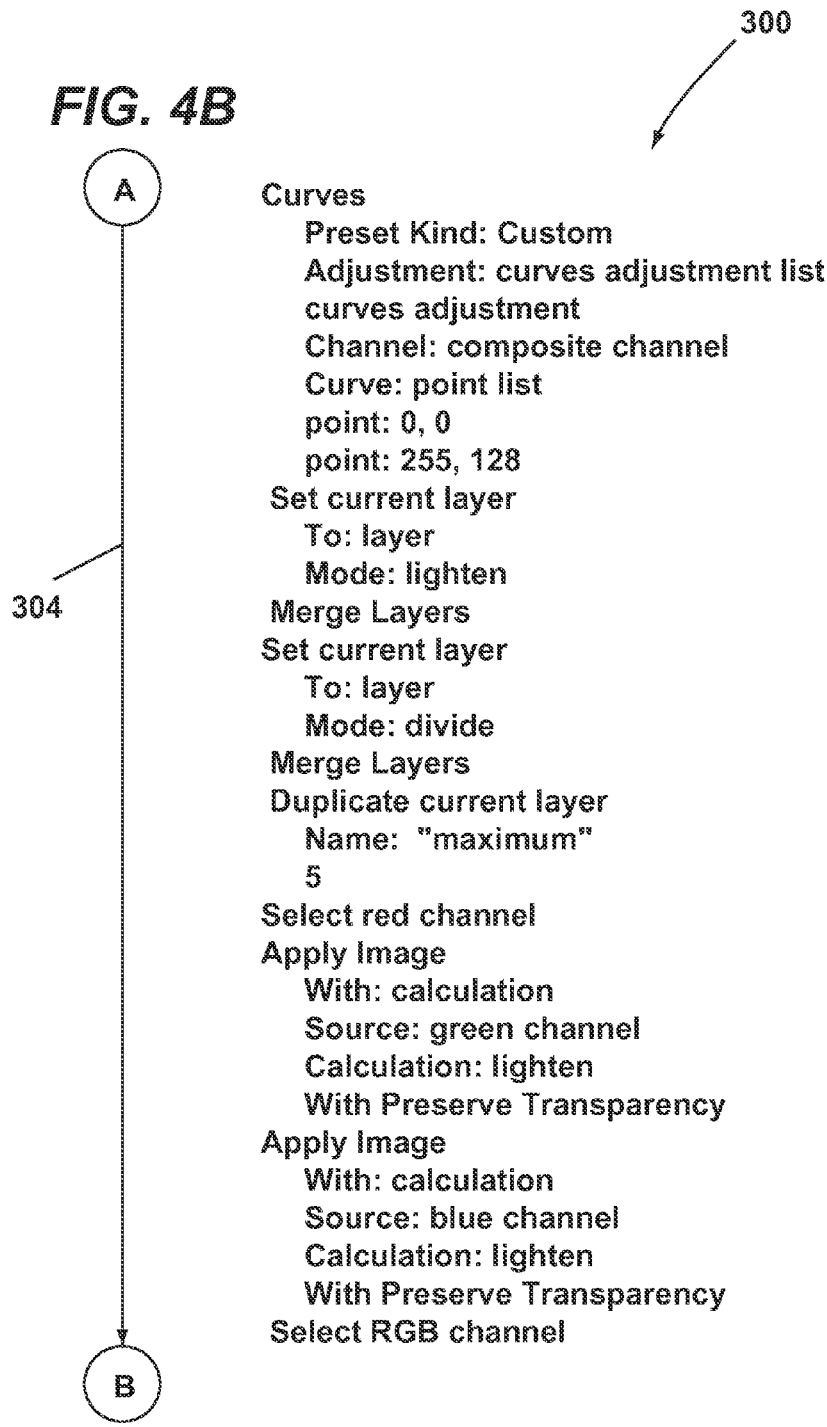

300

A

304

Curves
   Preset Kind: Custom
   Adjustment: curves adjustment list
   curves adjustment
   Channel: composite channel
   Curve: point list
   point: 0, 0
   point: 255, 128
Set current layer
   To: layer
   Mode: lighten
Merge Layers
Set current layer
   To: layer
   Mode: divide
Merge Layers
Duplicate current layer
   Name: "maximum"
   5
Select red channel
Apply Image
   With: calculation
   Source: green channel
   Calculation: lighten
   With Preserve Transparency
Apply Image
   With: calculation
   Source: blue channel
   Calculation: lighten
   With Preserve Transparency
Select RGB channel

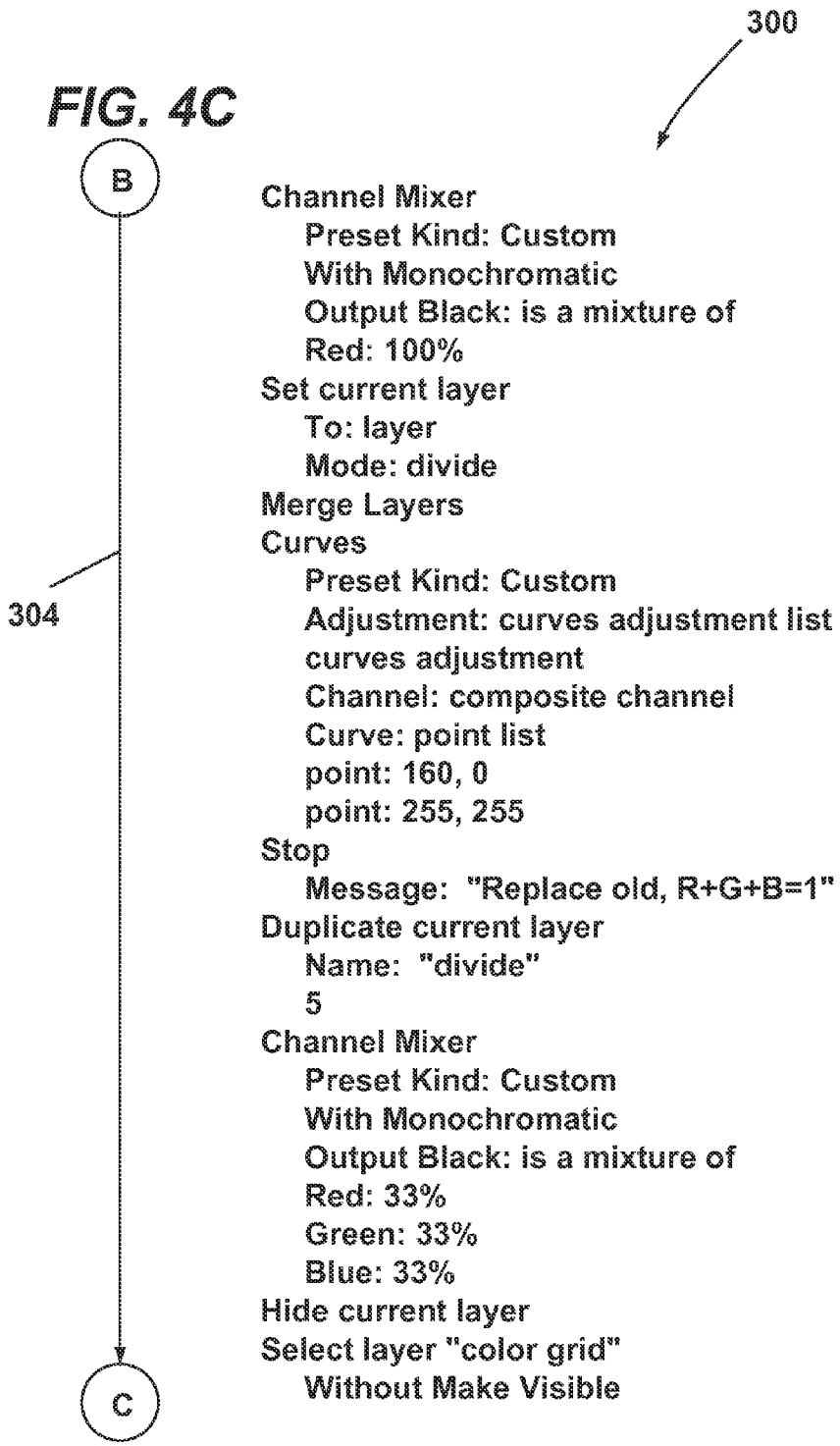

300

B

Channel Mixer
   Preset Kind: Custom
   With Monochromatic
   Output Black: is a mixture of
   Red: 100%
Set current layer
   To: layer
   Mode: divide
Merge Layers
Curves
   Preset Kind: Custom
   Adjustment: curves adjustment list
   curves adjustment
   Channel: composite channel
   Curve: point list
   point: 160, 0
   point: 255, 255
Stop
   Message: "Replace old, R+G+B=1"
Duplicate current layer
   Name: "divide"
   5
Channel Mixer
   Preset Kind: Custom
   With Monochromatic
   Output Black: is a mixture of
   Red: 33%
   Green: 33%
   Blue: 33%
Hide current layer
Select layer "color grid"
   Without Make Visible

```
Duplicate current layer                              ← 300
   Name: "color grid basis"
   5
Motion Blur
   Angle: 23
   Distance: 8 pixels
Motion Blur
   Angle: 23
   Distance: 7 pixels
Motion Blur
   Angle: -66
   Distance: 8 pixels
Motion Blur
   Angle: -66
   Distance: 8 pixels
Select layer "alpha"
   Without Make Visible
Show current layer
Duplicate current layer
   Name: "apply color grid"
   5
Apply Image
   With: calculation
   Source: RGB channel of layer "color grid"
   Calculation: multiply
Motion Blur
   Angle: 23
   Distance: 8 pixels
Motion Blur
   Angle: 23
   Distance: 7 pixels
Motion Blur
   Angle: -66
   Distance: 8 pixels
Motion Blur
   Angle: -66
   Distance: 8 pixels
Apply Image
   With: calculation
   Source: RGB channel of layer "color grid basis"
   Calculation: <unknown>
```

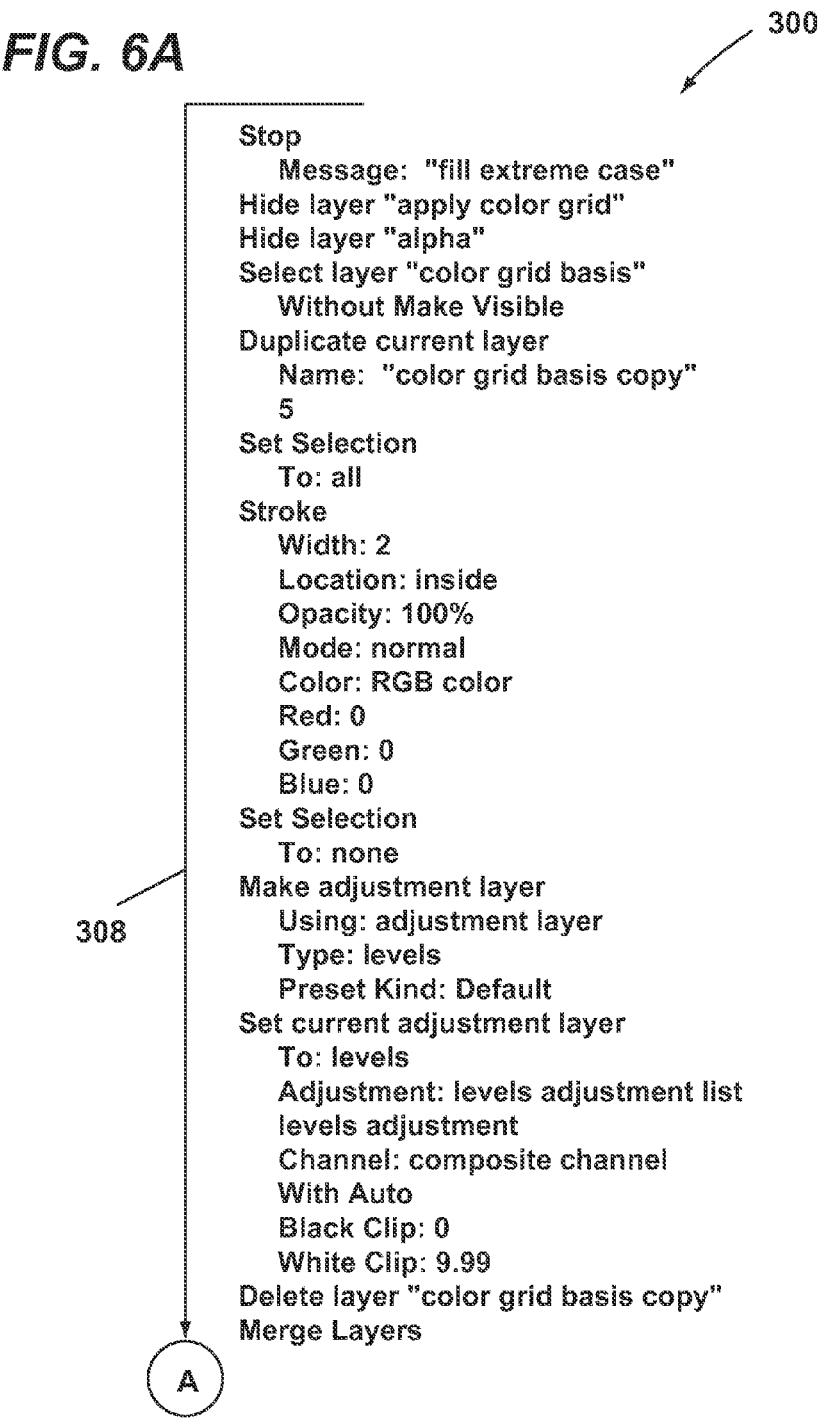

300

308

Stop
    Message: "fill extreme case"
Hide layer "apply color grid"
Hide layer "alpha"
Select layer "color grid basis"
    Without Make Visible
Duplicate current layer
    Name: "color grid basis copy"
    5
Set Selection
    To: all
Stroke
    Width: 2
    Location: inside
    Opacity: 100%
    Mode: normal
    Color: RGB color
    Red: 0
    Green: 0
    Blue: 0
Set Selection
    To: none
Make adjustment layer
    Using: adjustment layer
    Type: levels
    Preset Kind: Default
Set current adjustment layer
    To: levels
    Adjustment: levels adjustment list
    levels adjustment
    Channel: composite channel
    With Auto
    Black Clip: 0
    White Clip: 9.99
Delete layer "color grid basis copy"
Merge Layers (A)

FIG. 6B

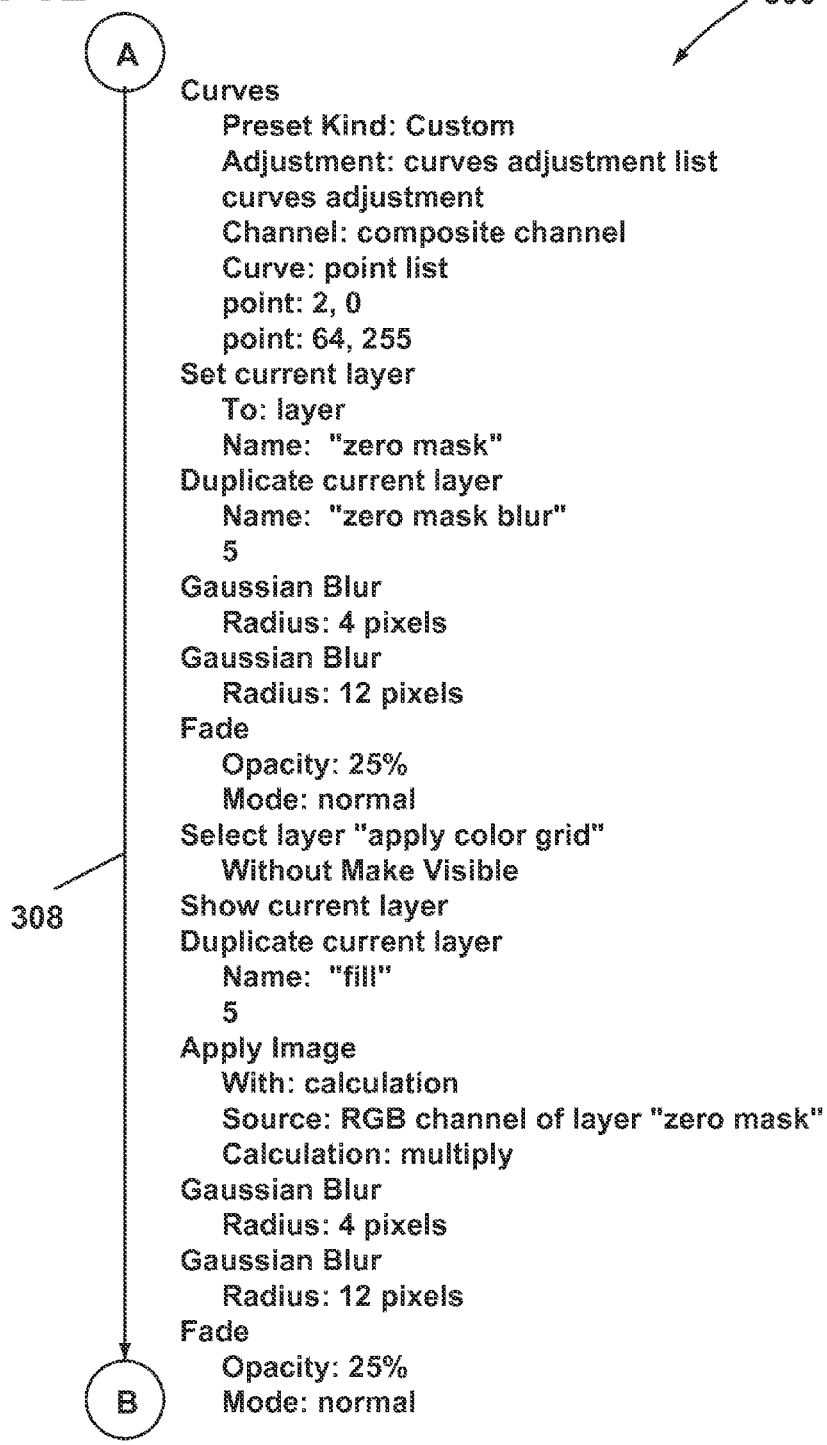

```
         300
          ↙
Ⓐ
  Curves
      Preset Kind: Custom
      Adjustment: curves adjustment list
      curves adjustment
      Channel: composite channel
      Curve: point list
      point: 2, 0
      point: 64, 255
  Set current layer
      To: layer
      Name: "zero mask"
  Duplicate current layer
      Name: "zero mask blur"
      5
  Gaussian Blur
      Radius: 4 pixels
  Gaussian Blur
      Radius: 12 pixels
  Fade
      Opacity: 25%
      Mode: normal
  Select layer "apply color grid"
      Without Make Visible
  Show current layer
  Duplicate current layer
      Name: "fill"
      5
  Apply Image
      With: calculation
      Source: RGB channel of layer "zero mask"
      Calculation: multiply
  Gaussian Blur
      Radius: 4 pixels
  Gaussian Blur
      Radius: 12 pixels
  Fade
      Opacity: 25%
      Mode: normal
Ⓑ
```

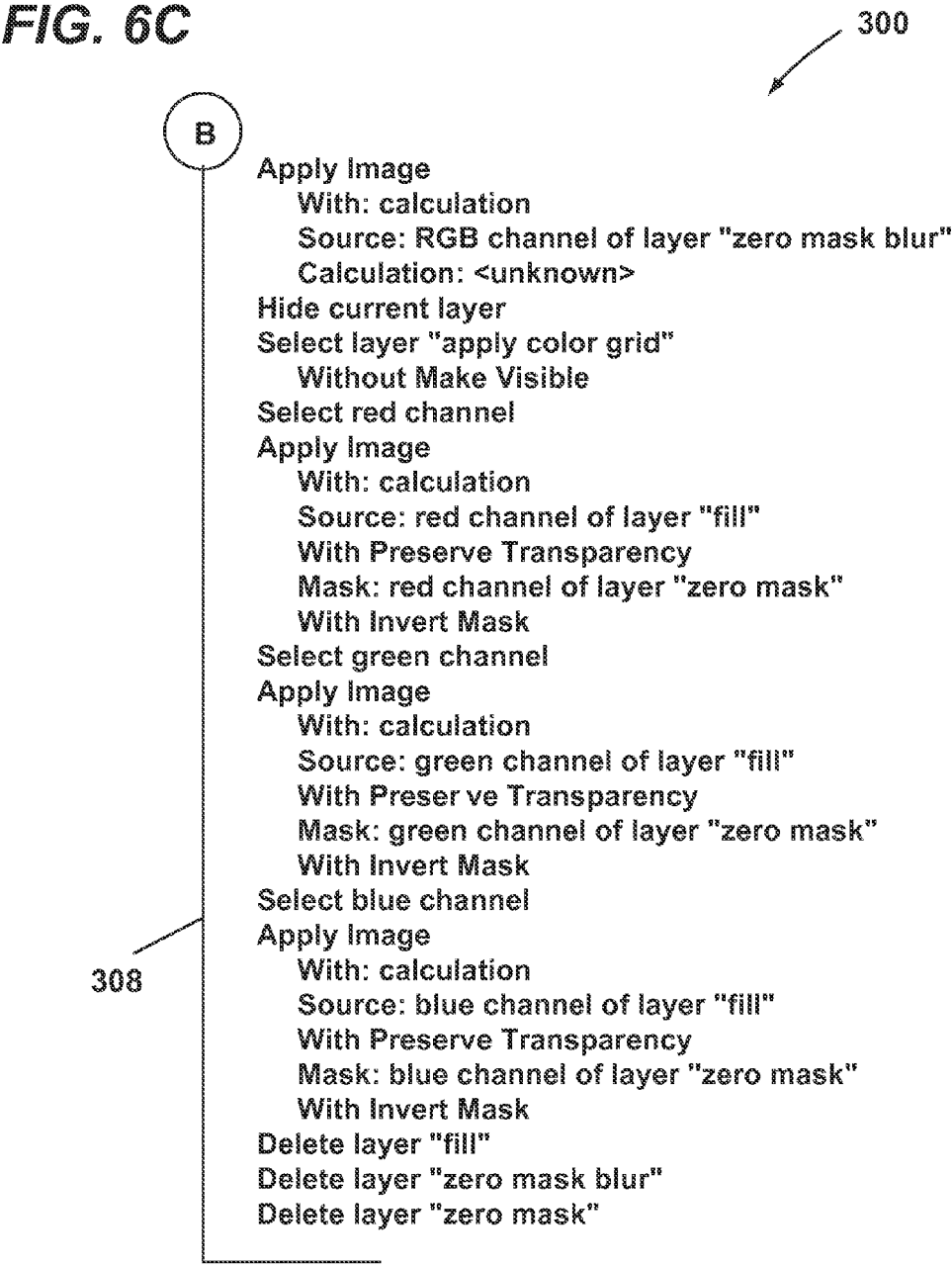

B

Apply Image
    With: calculation
    Source: RGB channel of layer "zero mask blur"
    Calculation: <unknown>
Hide current layer
Select layer "apply color grid"
    Without Make Visible
Select red channel
Apply Image
    With: calculation
    Source: red channel of layer "fill"
    With Preserve Transparency
    Mask: red channel of layer "zero mask"
    With Invert Mask
Select green channel
Apply Image
    With: calculation
    Source: green channel of layer "fill"
    With Preserve Transparency
    Mask: green channel of layer "zero mask"
    With Invert Mask
Select blue channel
Apply Image
    With: calculation
    Source: blue channel of layer "fill"
    With Preserve Transparency
    Mask: blue channel of layer "zero mask"
    With Invert Mask
Delete layer "fill"
Delete layer "zero mask blur"
Delete layer "zero mask"

```
Stop
    Message: "recover detail"
Make layer
    Using: layer
    Name: "detail"
Apply Image
    With: calculation
    Source: RGB channel of layer "alpha"
Stop
    Message: "replace with multiply"
Apply Image
    With: calculation
    Source: RGB channel of layer "color grid"
    Calculation: multiply
Curves
    Preset Kind: Custom
    Adjustment: curves adjustment list
    curves adjustment
    Channel: composite channel
    Curve: point list
    point: 0, 0
    point: 255, 128
Apply Image
    With: calculation
    Source: RGB channel of layer "apply color grid"
    Calculation: <unknown>
Channel Mixer
    Preset Kind: Custom
    With Monochromatic
    Output Black: is a mixture of
    Red: 100%
    Green: 100%
    Blue: 100%
Duplicate current layer
    Name: "comb"
    5
```

*FIG. 8C*

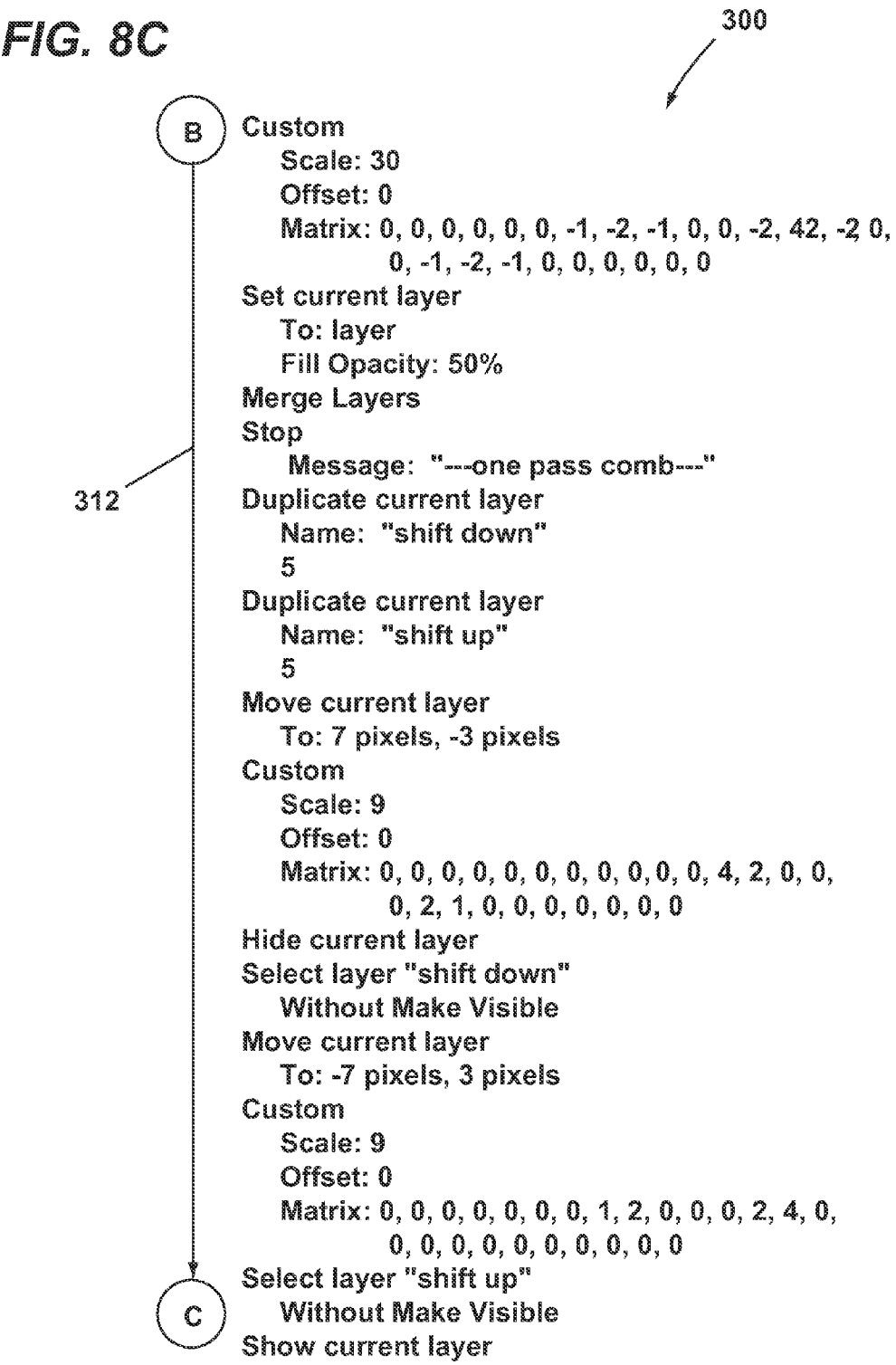

(B)

Custom
    Scale: 30
    Offset: 0
    Matrix: 0, 0, 0, 0, 0, 0, -1, -2, -1, 0, 0, -2, 42, -2, 0,
            0, -1, -2, -1, 0, 0, 0, 0, 0, 0
Set current layer
    To: layer
    Fill Opacity: 50%
Merge Layers
Stop
    Message: "---one pass comb---"
Duplicate current layer
    Name: "shift down"
    5
Duplicate current layer
    Name: "shift up"
    5
Move current layer
    To: 7 pixels, -3 pixels
Custom
    Scale: 9
    Offset: 0
    Matrix: 0, 0, 0, 0, 0, 0, 0, 0, 0, 0, 0, 4, 2, 0, 0,
            0, 2, 1, 0, 0, 0, 0, 0, 0, 0
Hide current layer
Select layer "shift down"
    Without Make Visible
Move current layer
    To: -7 pixels, 3 pixels
Custom
    Scale: 9
    Offset: 0
    Matrix: 0, 0, 0, 0, 0, 0, 0, 1, 2, 0, 0, 0, 2, 4, 0,
            0, 0, 0, 0, 0, 0, 0, 0, 0, 0
Select layer "shift up"
    Without Make Visible
Show current layer

312

(C)

FIG. 8G (F) Hide current layer
Select layer "shift down"     300
    Without Make Visible
Move current layer
    To: 3 pixels, 7 pixels
Custom
    Scale: 4
    Offset: 0
    Matrix: 0, 0, 0, 0, 0, 0, 1, 1, 0, 0, 0, 1, 1, 0, 0, 0
            0, 0, 0, 0, 0, 0, 0, 0, 0
Select layer "shift up"
    Without Make Visible
Show current layer
Set current layer
    To: layer
    Fill Opacity: 50%
Merge Layers
Custom
    Scale: 30
    Offset: 0
    Matrix: 0, 0, 0, 0, 0, 0, -1, -2, -1, 0, 0, -2, 42, -2,
            0, 0, -1, -2, -1, 0, 0, 0, 0, 0, 0
Set current layer
    To: layer
    Fill Opacity: 50%
Merge Layers
Stop
    Message: "---end pass comb"
Curves
    Preset Kind: Custom
    Adjustment: curves adjustment list
    curves adjustment
    Channel: composite channel
    Curve: point list
    point: 1, 0
    point: 255, 255
Invert
Set current layer
    To: layer
    Mode: linear light
Set current layer
    To: layer
    Fill Opacity: 52%
Merge Layers

```
Hide current layer
    Select layer "apply color grid"
    Without Make Visible
Stop
    Message: "substitute multiply"
Apply Image
    With: calculation
    Source: RGB channel of layer "detail"
    Calculation: multiply
Curves
    Preset Kind: Custom
    Adjustment: curves adjustment list
    curves adjustment
    Channel: composite channel
    Curve: point list
    point: 0, 0
    point: 128, 255
Flatten Image
  Stop
```

300

314

RESTORATION OF PHOTOGRAPHIC FILM HAVING A COLOR MATRIX USING DIGITAL PHOTOGRAPHIC FILM PROCESSING TECHNIQUES

CROSS-REFERENCE TO RELATED APPLICATIONS

This non-provisional patent application claims priority from U.S. Provisional patent application having Ser. No. 61/989,317, filed 6 May 2014, entitled "RECOVERY OF IMPROVED DIGITAL IMAGES FROM COLOR MATRIX FILM", having a common applicant herewith and being incorporated herein in its entirety by reference.

FIELD OF THE DISCLOSURE

The disclosures made herein relate generally to photographic film processing techniques and, more particularly, to restoration of photographic film having a color matrix using digital photographic film processing techniques.

BACKGROUND

Shortly after about the year 1900, it became possible to sensitize film to red light. This presented the possibility of full color photography and led to color films using a dense matrix of red, green, and blue filters (i.e., color grid), called a "Reseau". The Reseau is permanently adhered over a panchromatic black and white film (i.e., referred the herein as a Reseau-enhanced panchromatic film). Dufaycolor brand film (i.e., a Dufay film) and Autochrome brand film (i.e., an Autochrome film) are examples of such Reseau-enhanced panchromatic film. The disclosures made herein relate to color film restoration, and particularly to restoration of early color films that use a color grid over an underlying silver film (i.e., silver layer on a film substrate) such as Dufaycolor brand film and Autochrome brand film.

FIG. 1 shows a cross section of a Dufay film 100, which is an example of a Reseau-enhanced panchromatic film (i.e., a color matrix film). The Dufay film 100 is an example of classic Dufay in which a color grid 102 (i.e., a reseau color grid) is assembled on a film base 104 (e.g., a clear film base) in a light room, and then a sensitive emulsion 106 (i.e., a silver layer) is coated over the color grid in the dark. Therefore, exposure is made through the film base 104. As shown in FIG. 1, red light 107 passes through the film base 104 and red cells 108 of the color grid 102, but not blue cells 110 of the color grid 102. The red light 107 exposes the emulsion adjacent to the red cells 108, but not blue cells 110. When the Dufay film 100 is developed as a negative and later viewed, the exposure from the red light (i.e., red light exposure) has caused the sensitive emulsion 106 to appear blue because only light passing through the blue cells is allowed to continue through unexposed (i.e., clear) emulsion. The opposite would happen if the Dufay film were developed as a positive.

FIG. 2 shows the topology of the color grid 102 of the Dufay film 100 in FIG. 1. It can be seen that there is variability in the color grid 102, which manifests as color noise. In addition to the variability, there is one or more relatively large defects 200 where one or more of the colors of the color grid 102 has exceeded its intended bounds.

As an example of the resulting functionality of a Reseau-enhanced panchromatic film, a red dress would expose primarily through the red filters to the film under the red filters. After reversal development, light would pass through the film primarily through the film that was under the red filters and thus through the adhered red filters, and red light would predominate in the view. This method was in use from the century years to the mid-1950s, resulting in the first generation of images of our world in full color, tracking half a century of color imagery. Many of these images are now treasured in artistic and historical archives worldwide.

It is well known that color matrix dots such as that of a Reseau-enhanced panchromatic film are distracting when viewed directly. However, the eye integrates to an extent so the image can still be enjoyed. A special problem arises in the modern world of digital photography because the color matrix is simply not digital friendly. The images can not practically be presented on a modern display in their original form of colored dots, and removing the dots to make them compatible with modern displays leads to further deterioration of the image.

Therefore, techniques for clarifying the aforementioned images with color matrix film and preparing them for modern (e.g., digital) display would be advantageous, desirable and useful.

SUMMARY OF THE DISCLOSURE

Embodiments of the present invention are directed to using digital photographic film processing techniques for restoration of photographic film having a color grid over an underlying silver film. More specifically, embodiments of the present invention improve the resolution (i.e., clarity) of images with color matrix dots (e.g., Reseau-enhanced panchromatic film) for use with modern (e.g., digital) display technologies. In doing so, embodiments of the present invention advantageously overcome the adverse situation of color matrix dots in images being distracting when viewed directly, particularly in the case of the modern world of digital photography because such a color matrix has previously not been digital friendly.

In one embodiment of the present invention, a method is performed by an image processing apparatus. The method comprises a plurality of operations. An operation of scanning an image of a color matrix film to generate a digital color copy thereof is performed. An operation of generating an image of the underlying silver layer of the color matrix film is performed. Generating an image of the underlying silver layer includes scanning an infrared alpha layer image from the color matrix film. An operation of separating a color grid of the color matrix film from an underlying silver layer of the color matrix film to produce a color grid image is performed. Separating the color grid from the underlying silver layer includes computationally dividing the digital color copy of the image by the infrared alpha layer image. An operation of purifying the color grid image is performed and an operation of using the purified color grid image to generate an altered version of the digital color copy is performed.

In another embodiment of the present invention, a device comprises a non-transitory computer-readable medium having tangibly embodied thereon and accessible therefrom processor-interpretable information defining a visual image. The processor-interpretable information has been generated using a method comprising a plurality of operations. An operation of scanning an image of a color matrix film to generate a digital color copy thereof is performed. An operation of generating an infrared alpha layer image from the color matrix film is performed. An operation of separating a color grid of the color matrix film from an underlying silver layer of the color matrix film to produce a color grid image is performed. Separating the color grid from the underlying silver layer includes computationally dividing the digital color copy of the image by the infrared alpha layer image. An operation of purifying the color grid image is performed and an operation of using the purified color grid image to generate an altered version of the digital color copy is performed.

In another embodiment of the present invention, an image processing apparatus, comprising a non-transitory computer-readable medium having accessible therefrom instructions defining an image processing method and at least one processor coupled to the non-transitory computer-readable medium for accessing and executing the instructions defining the image processing method. Executing the instructions defining the image processing method includes scanning an image of a color matrix film to generate a digital color copy thereof, generating an infrared alpha layer image from the color matrix film, separating a color grid of the color matrix film from an underlying silver layer of the color matrix film to produce a color grid image, purifying the color grid image is performed, and using the purified color grid image to generate an altered version of the digital color copy. Separating the color grid from the underlying silver layer includes computationally dividing the digital color copy of the image by the infrared alpha layer image.

These and other objects, embodiments, advantages and/or distinctions of the present invention will become readily apparent upon further review of the following specification, associated drawings and appended claims.

BRIEF DESCRIPTION OF THE DRAWINGS

FIG. 2 is a flow diagram showing a method configured in accordance with an embodiment of the present invention for restoring an image in a color matrix film.

FIGS. 4A-4D is a block diagram showing an operation configured in accordance with an embodiment of the present invention for computationally separating a color grid from an underlying silver layer of a color matrix film and creating a purified color grid image therefrom.

FIG. 5 is a block diagram showing an operation configured in accordance with an embodiment of the present invention for removing a repetitive pattern from a purified color grid image and applying the purified color grid image over an image in an underlying silver layer of a color matrix film.

FIGS. 6A-6C is a block diagram showing an operation configured in accordance with an embodiment of the present invention for finding relatively large defects in a color grid image and filling them with color from a larger region around the respective one of the relatively large defects.

FIG. 7 is a block diagram showing an operation configured in accordance with an embodiment of the present invention for reducing pronounced color grid patterns in areas of bright color of a color matrix image.

FIGS. 8A-8G is a block diagram showing an operation configured in accordance with an embodiment of the present invention for reducing pronounced color grid patterns in areas of bright color of a color matrix image.

FIG. 9 is a block diagram showing an operation configured in accordance with an embodiment of the present invention for combining an "Apply color grid" image and "Detail" image.

DETAILED DESCRIPTION

Figure 1A:
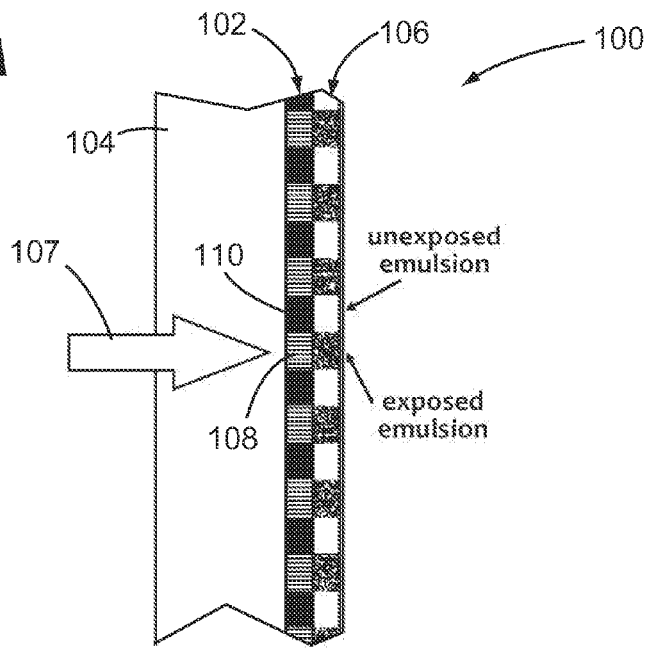
FIG. 1A is a cross-sectional view of a Dufay film
Figure 1B:
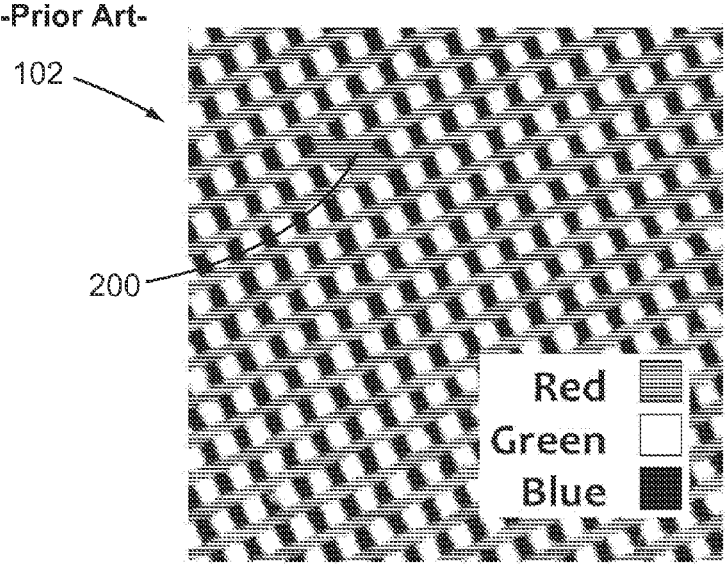
FIG. 1B is a plan view showing topology of the color grid of the Dufay film shown in FIG. 1A, with a color legend overlaying plan view

When viewing color matrix films, typically artifacts including grain, color noise, and defects such as red blobs deface the image. These artifacts arise from variations in silver grains in the underlying silver film (i.e., silver layer on a film substrate), but also from variations in the overlying color matrix (i.e., the color grid) itself. It is disclosed herein that, in general, most of the objectionable artifacts arise from variations in a color grid, not from the underlying silver film.

Advantageously, embodiments of the present invention provide for digitally nulling of the visual effect of variations in the color grid of a suitable configured color matrix film through use of a suitably configured apparatus. A Reseau-enhanced panchromatic film is an example of such a suitable configured color matrix film. In one implementation of such nulling, an operation is performed to separate the color grid from the underlying silver film. Thereafter, an operation is performed for deriving the visual effect that variations in the color grid had on the underlying silver film. An operation for removing the effects of variations in the color grid from the final image of the color matrix film is then performed.

In the past, the resolution of a color matrix film (e.g., a Reseau-enhanced panchromatic film) was limited by the spacing of the dots in the color grid, in analogy to the resolution limitation of a Bayer array by the spacing of color dots. The underlying silver film in a Reseau-enhanced panchromatic film or other suitably configured color matrix film retains its native resolution and, because the color matrix is typically transparent rather than translucent, the silver film records detail up to its native resolution. Advantageously, embodiments of the present invention provide for digitally recovering that detail through use of a suitably configured apparatus. In one implementation of such detail recovery, an operation is performed to separate the color matrix from the underlying silver film. Thereafter, an operation is performed to derive the visual effect that the color grid had on the underlying silver film. An operation for removing the effects of the color grid, thereby leaving the high-resolution image in the underlying silver film, is then performed.

It can be seen that an important step for both nulling of the effect of variations in the color grid and recovering the detail that the silver film records is to separate the color grid from the underlying silver film. Although this could in theory be done physically with a microtome to slice the physical film, such physical separation is not practical or efficient. Preferably, however, embodiments of the present invention provide for such separation mathematically using, for example, a suitably configured apparatus. One example of such a suitably configured apparatus is a scanner with computer code for performing such separation. Another example is a scanner connected to a computer with computer code for performing such separation.

An example of mathematical separation begins with a color scan of a color matrix film at a resolution that exceeds a specified frequency (e.g., Nyquist frequency) of the color grid. Normally, this select resolution is far above the specified frequency of the color grid to prevent adverse conditions such as, for example, aliasing. A resolution of 4 K pixels per inch is normally an adequate resolution if part of the effect of alias is mathematically removed along with the other color noise, as is discussed below in greater detail.

It is also disclosed herein that a partial separation of the color grid can be done with a red-green-blue scan by assigning each pixel its hue and color intensity, but ignoring brightness in order to remove the black and white image in the underlying silver film. The black and white image in the underlying silver film is estimated by taking the maxima of the red, green, or blue scan. This alternate method of separation is typically imperfect, and thus less desirable, because density variations of the color grid are ascribed directly to the silver image, resulting in excess noise in the recovered silver image and only a partial recovery of the color grid.

A preferred mode of color separation includes scanning the color matrix film with a fourth wavelength in the infrared portion of the spectrum. The mathematics behind this are well understood in the prior art, and will by abbreviated here by ICE™ technology, which is disclosed in U.S. Pat. No. 5,266,805. In infrared, the dye-based color grid primarily disappears, and a substantially pure scan of the silver image is obtained. There may be a slight bleed from the green and blue dyes, and removing this bleed is also well understood in the prior art of ICE technology. Once the underlying silver image is obtained, the resultant silver image can be divided away from the red-green-blue scan to obtain a substantially pure color grid independent of the silver image. In this case, the silver image may be considered the "defect", and the mathematics of removing (i.e., dividing away) the resultant silver image is well understood in the prior art (e.g., ICE technology).

The color grid has many imperfections. In a typical variation, the red dye may simply widen to cover a wider area (e.g., a 10% wider area). In a direct view of the color matrix film, this appears as a reddish spot because that wider area transmits 10% more red light. However, what this actually means is that mathematically "red" has been sampled over a wider area, not necessarily that there was more red light. A simple fix for this variation begins with mathematically laying the separated (i.e., recovered) color grid over a theoretical "perfect" blank silver image that is totally neutral to produce a norming image. The area where the red dye was 10% wider will still have 10% more red in this norming image. The direct view image and the norming image are processed by blurring to remove the color grid, as known in the prior art, with both preferably being processed identically. The next step is to divide the direct view of the color matrix film with the norming image to remove the red (i.e., 10% more, divided by 10% more, neutralizes the defect). Also in this example technique, all or a portion of any aliasing of the sample grid with the scanner resolution is also neutralized.

In some cases, one color extends over a very wide area to produce a blob. Embodiments of the present invention can be implemented to detect the presence of such a blob by its size, and extrapolate the other colors from surrounding pixels. In some cases, a density of the color grid affects the recorded image. For example, if the green dye is too dense, although green is still recorded, the underlying silver film will see less light because of the density of the green dye. By knowing the density of the dye at all or a suitable portion of the pixels, embodiments of the present invention can be implemented such that the effect of this density on the resulting image in the underlying silver film can be mathematically compensated to remove the effect of dye density variations. Most basically, this compensation is performed by dividing the density of the underlying silver film by the dye density at each pixel.

It is disclosed herein that, according to sampling theory, the resolution of color, also called chroma, is limited by the spacing of the color grid in a color matrix film. However, it is disclosed herein that single channel black and white, also called luminance or luma, can be recovered to higher resolutions from a color matrix film. In preferred embodiments of the present invention, a lower resolution chroma is recovered from separation and is combined with a higher resolution luma. This combination of low resolution chroma and high resolution luma is well known, for example in digital processing standards such as JPEG, MPEG, NTSC, PAL, VHS and many other standards transmit, store, and display chroma at a lower resolution than luma.

The underlying silver image, which is recovered by scanning with infrared in the preferred embodiments of the present invention, has a high-resolution view of the original scene, multiplied by the effect of the color grid. This is physically a result of the dyes being transparent, so image detail is transmitted through the dye within the domain of each color dye filter of the color grid. The effects of the color grid on the high-resolution single channel image, which is recorded by the black and white image in the underlying silver film, can be reduced by a series of steps. For example, in a region with a color cast, such as sky or skin, one of the color tiles will predominate, causing a pattern in the black and white image of the underlying silver film at the frequency of that color in the color grid. By using the chroma information recovered earlier, the light under each color filter (i.e., a tile) can be normed to the relative amount of that color in the region. In an exemplary area of sky, the recovered brightness seen under each blue tile is reduced within the domain of the blue tile, and the recovered brightness seen under each red tile is increased within the domain of the red tile to match the brightness of the red and blue tiles in the region. To the extent this matching is perfected, detail affecting all colors, such as the edge of a cloud or a rigging rope on a boat, traces from tile-to-tile to build a continuous high-resolution image. The color grid has variations in density. Particularly at the edges of each color tile where the dyes blend, the density of a color grid of a Dufay or suitably similar type of color matrix film typically increases. By seeing the density of each pixel of the recovered color grid, the recovered brightness seen by the underlying silver film can be normed for that density, thus further removing the effects of variations in the color grid from the high-resolution image. It is disclosed herein that the direction of norming can be oriented dependent on whether processing a reversal for a positive or negative film.

Even with the afore-mentioned steps applied, there is usually still a residue of the color grid because of sampling theory interactions with the color grid and the direct view image of the color matrix film. This residue can be further reduced by applying a comb filter at or near the frequency of the color grid such as by using well-known techniques of screen removal from scans of halftone images. A comb filter with a frequency response that produces relatively narrow comb notches in the frequency domain will leave residue edge effects between image regions of different colors, while a comb filter with a frequency response that produces relatively wide comb notches will soften (i.e., blur) the image. Preferably, embodiments of the present invention implement a comb filter or other suitable processing technique in a manner causing the color grid to be removed to the point of invisibility over most of the image with almost imperceptible softening (i.e., blurring) of the luma image of the underlying silver film.

After recovery, the relatively high-resolution luma image is combined with the relatively lower resolution chroma image to give the final output image (i.e., reconstructed direct film image). Equivalently, the relatively lower resolution chroma image can be derived to include a relatively low-resolution luminance. In other words, the comb and/or other blurring filters can be applied to both the luma and chroma images and then just the higher spatial frequency detail from the luma image can be added to give the final output image.

FIG. 2 shows a method 200 configured in accordance with an embodiment of the present invention for restoring an image in a color matrix film. A reseau-enhanced panchromatic film is an example of a reseau-enhanced panchromatic film. The method 200 can be performed by an image processing apparatus such as a scanner configured to perform restoration of an image in a color matrix film in accordance with an embodiment of the present invention, by a computer configured to perform restoration of an image in a color matrix film in accordance with an embodiment of the present invention, or other suitably configured image processing apparatus.

The method 200 includes an operation 202 for providing a color matrix film with an image exposed therein (e.g., being placed on a scanner bed of a scanner or provided via an connection to a device such as a camera, computer or other like). Then, an operation 204 of scanning a color matrix film with visible light to generate a digital color copy thereof is performed and an operation 206 of scanning the color matrix film with infrared light to generate an infrared alpha layer image thereof is performed. Using information from such scans, an operation 208 is of separating a color grid of the color matrix film from an underlying silver layer of the color matrix film is performed to produce a color grid image (e.g., an image or other form of visual representation of the color grid). Separating the color grid from the underlying silver layer can include computationally dividing the digital color copy of the image by the infrared alpha layer image. Next, an operation 210 of using the color grid image to generate an altered version of the digital color copy.

Discussed now in reference to FIG. 3-10 is an image processing method 300 configured in accordance with an embodiment of the present invention (e.g., a more detailed version of the method 200 discussed above in reference to FIG. 2). The image processing method 300 can be implemented as a set of instructions (e.g., a computer program) that are accessed from a non-transitory computer readable medium and are carried out by one or more data processing devices. It is disclosed herein that the set of instructions, the non-transitory computer readable medium, and the one or more data processing devices can be embodied in an apparatus such as an image scanning device (e.g., a standalone scanner, a computer running a program comprising the set of instructions, or the like). One example of such a computer program is commercially-available from Adobe Systems under the tradename PHOTOSHOP Version CS6, which includes a programming functionality referred to as ACTION (i.e., Photoshop Action functionality). A user can use the Photoshop Action functionality to specify and implement a set of image processing operations (i.e., instructions) of an image processing method (e.g., the image processing method 300) configured in accordance with embodiments of the present invention can be. It is disclosed herein that a single operation of such am image processing method can comprise a plurality of respective steps.

For clarity, it is disclosed herein that there are certain known issue with the Photoshop Action functionality that causes terminologies for certain steps to be recorded in a manner that lacks proper specificity. One such issue is that the step of "Calculation:<divide>" (i.e., dividing step) is recorded under the terminology of "Calculation:<unknown>". However, the Photoshop Action functionality performs this divide step correctly. Another such issue is that the extraneous number "5" is sometimes recorded following a name, such as "color grid", however again the Photoshop Action functionality performs the step correctly as though "5" was not there. These anomalies in the Photoshop Action functionality can be seen in corresponding operations of the method 300 depicted in FIGS. 3-10.

Figure 3:
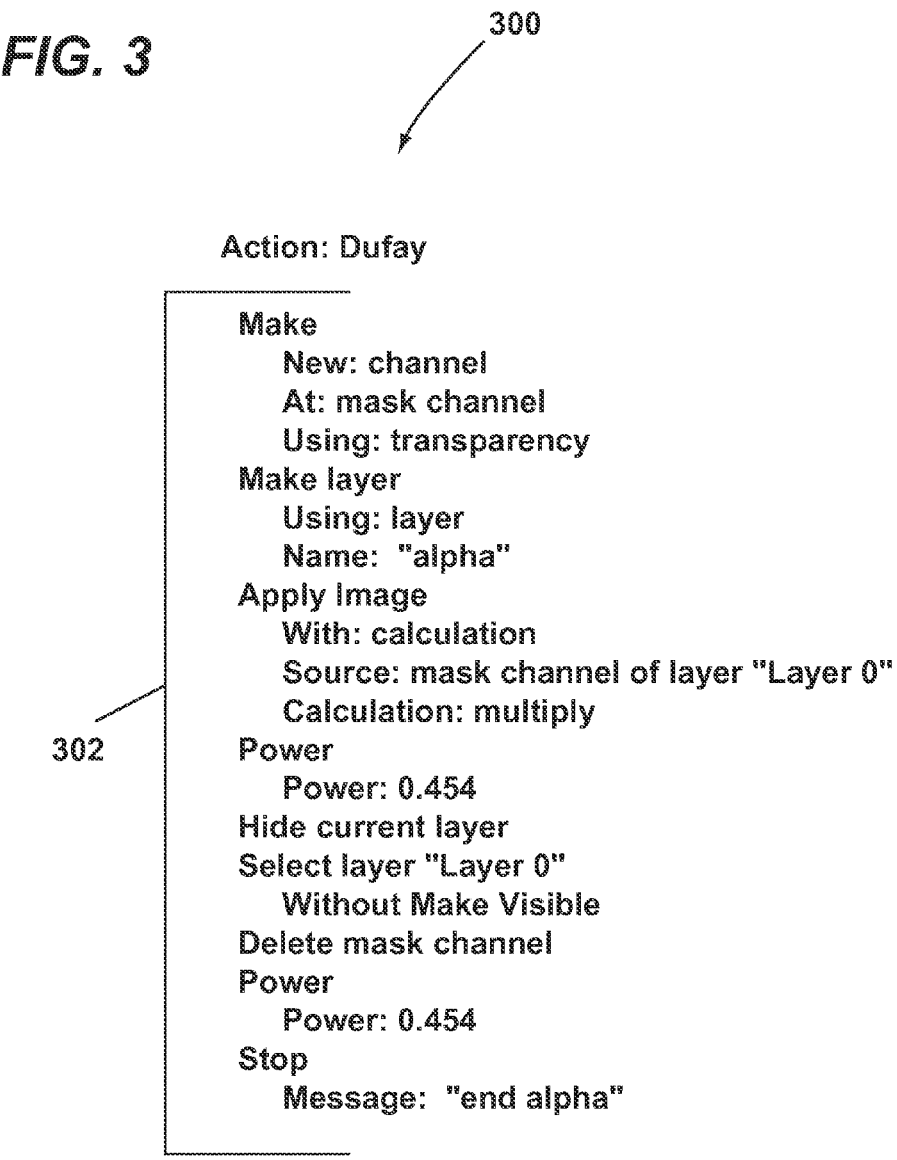
FIG. 3 is a block diagram showing an operation configured in accordance with an embodiment of the present invention for generating a scanned image from a color matrix film having a color grid over a silver layer on a film substrate.
Figure 4D:
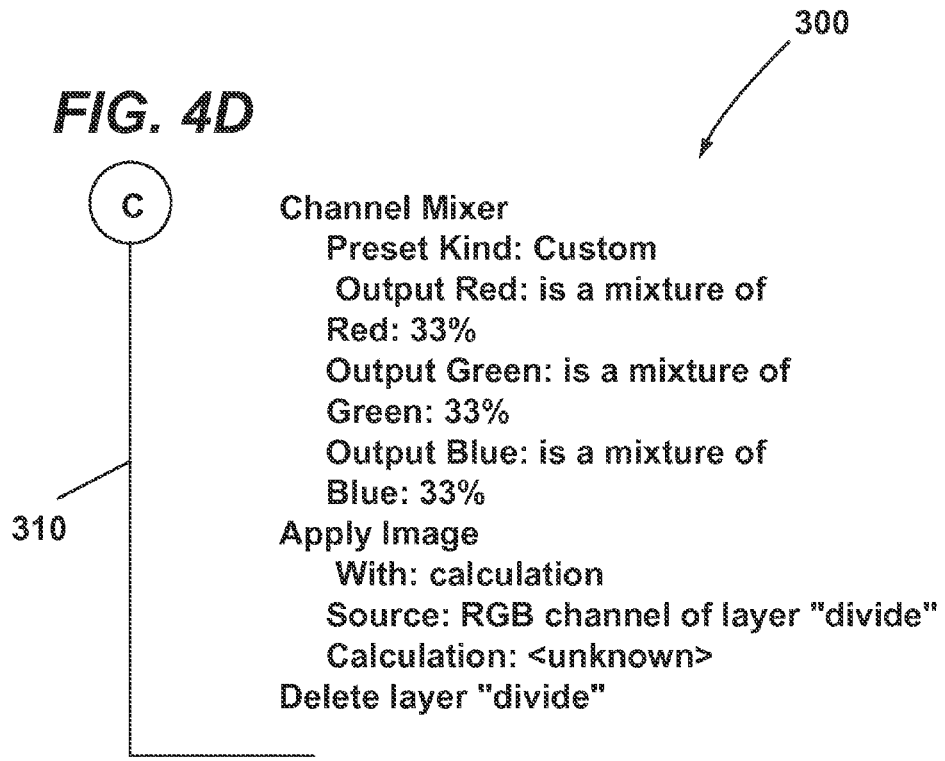
Figure 8A:
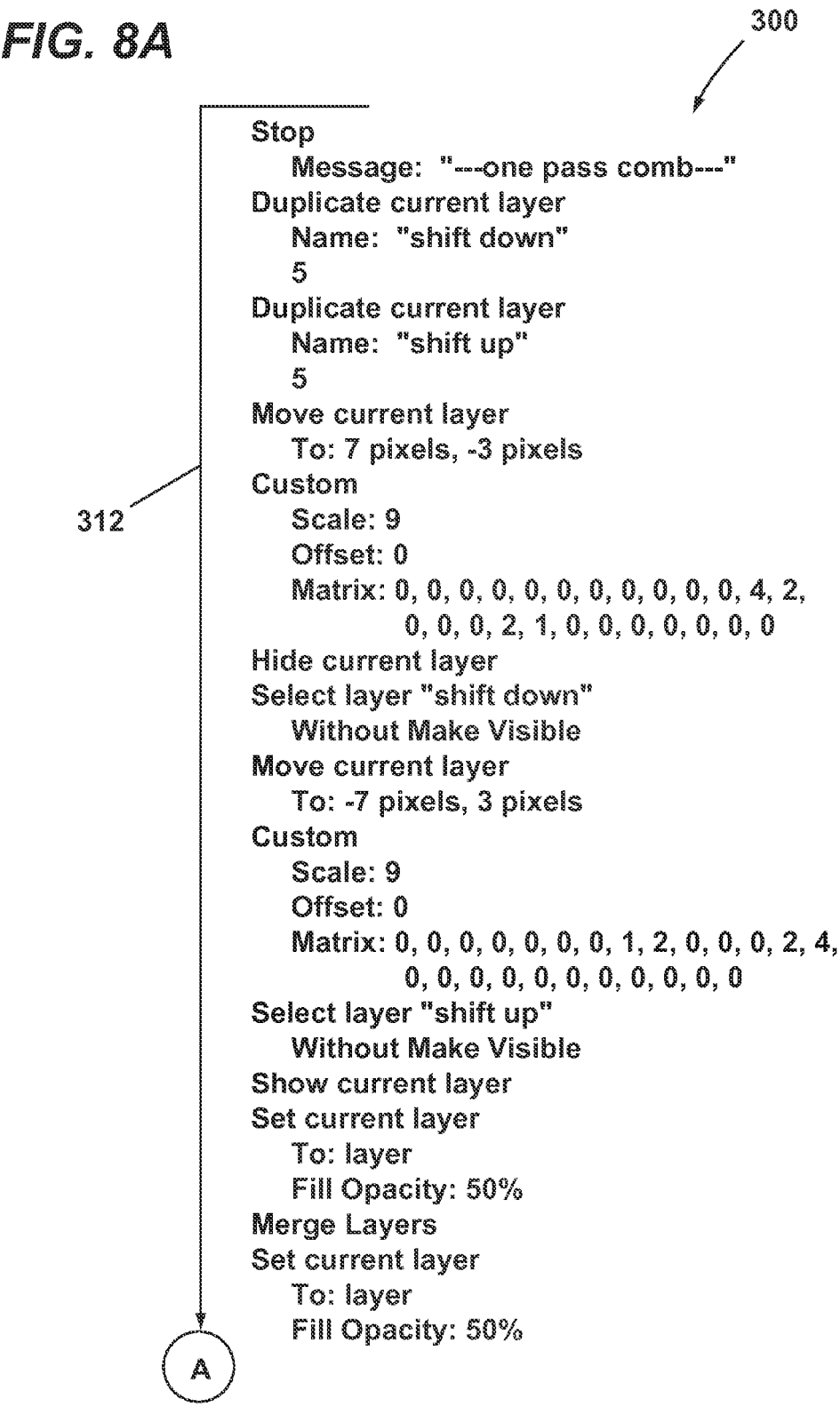
Figure 8B:
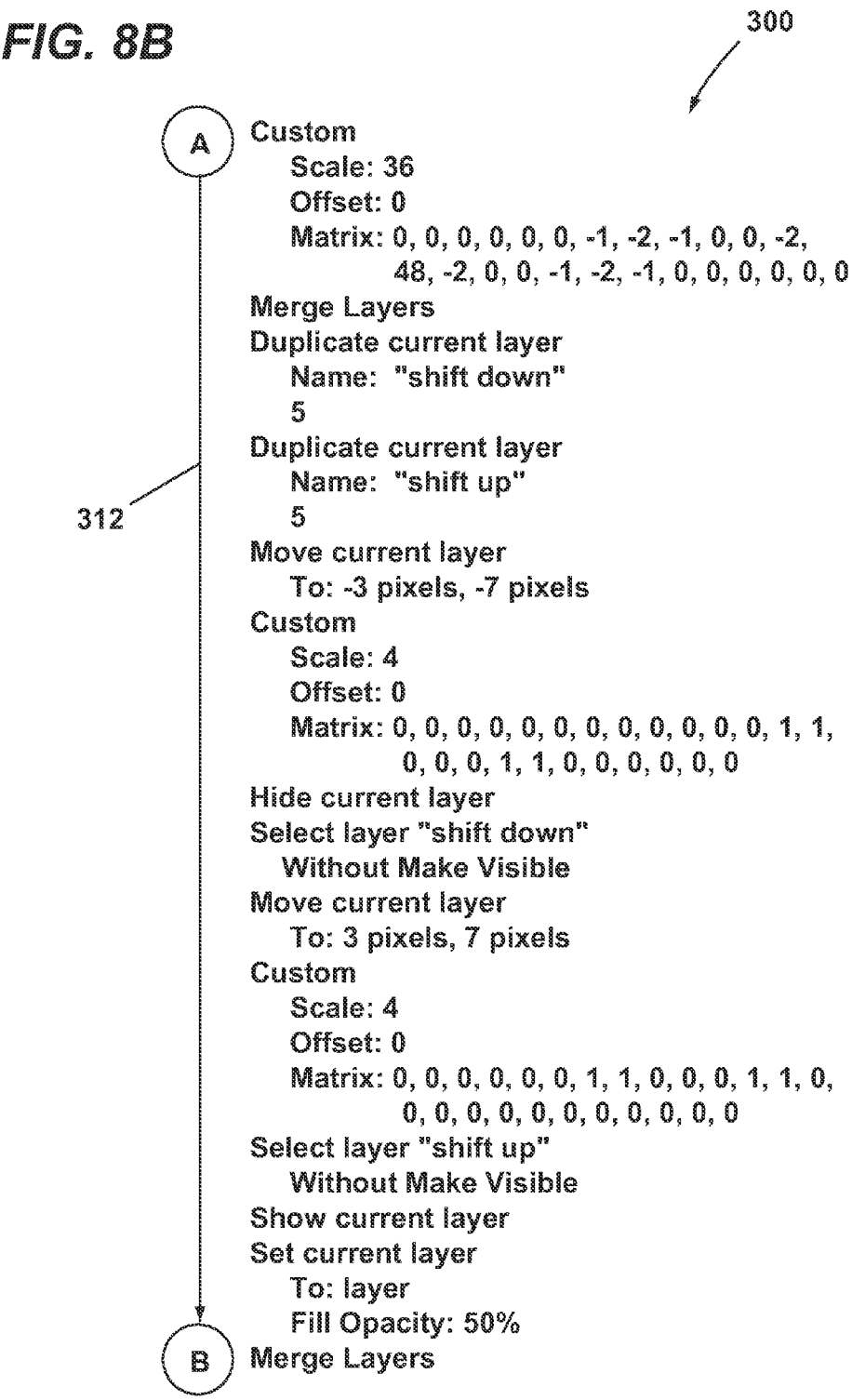
Figure 8D:
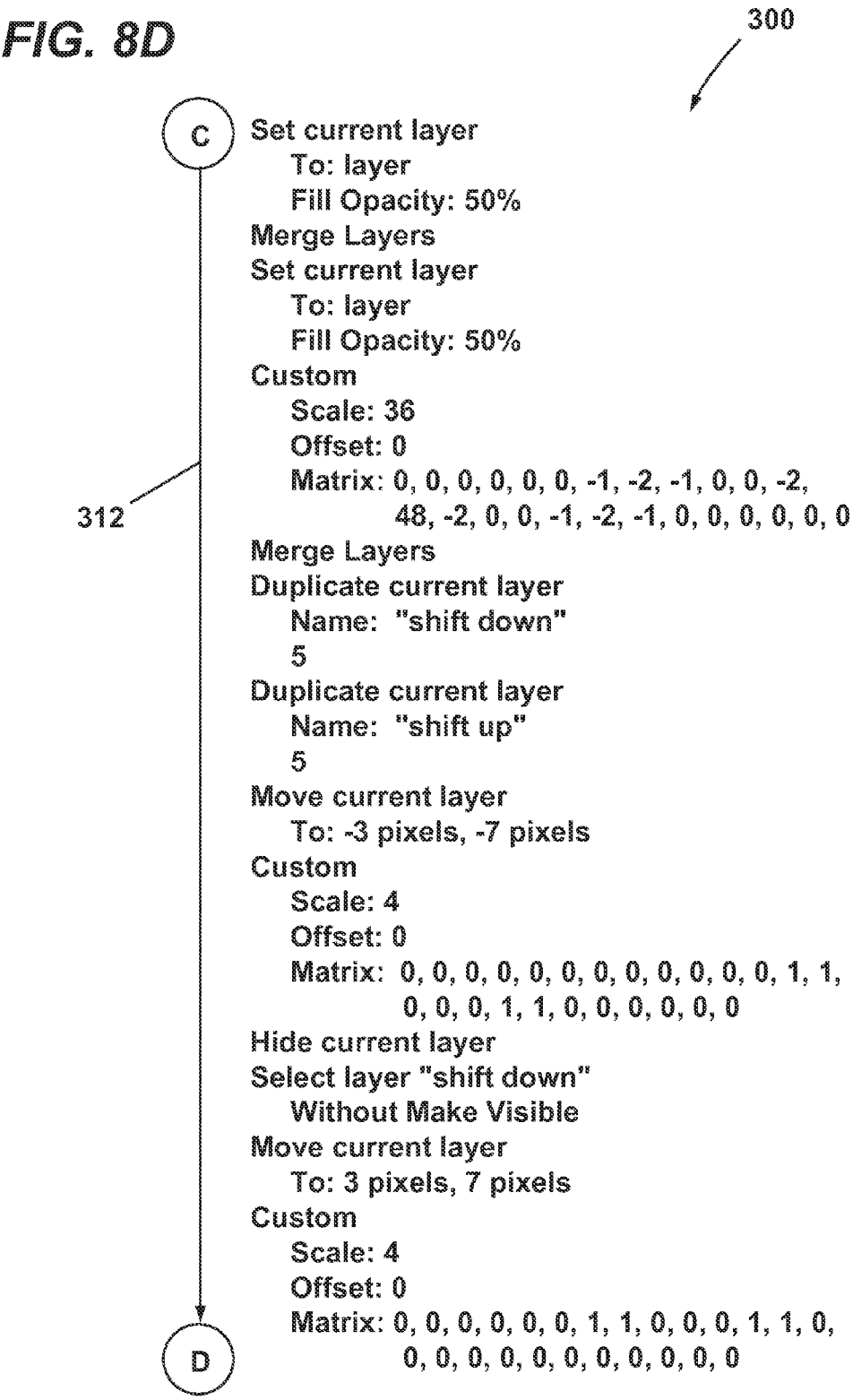
Figure 8E:
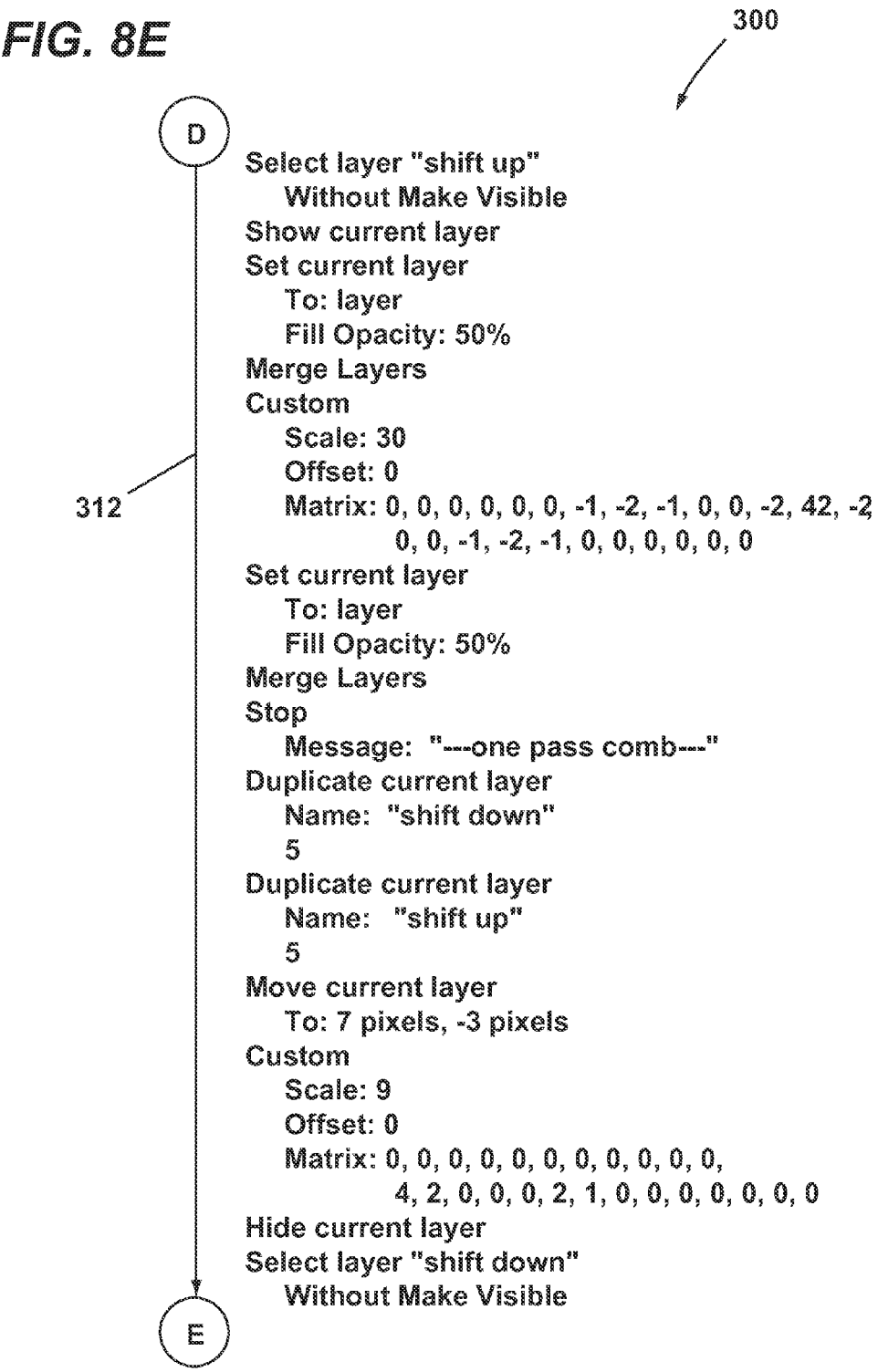
Figure 8F:
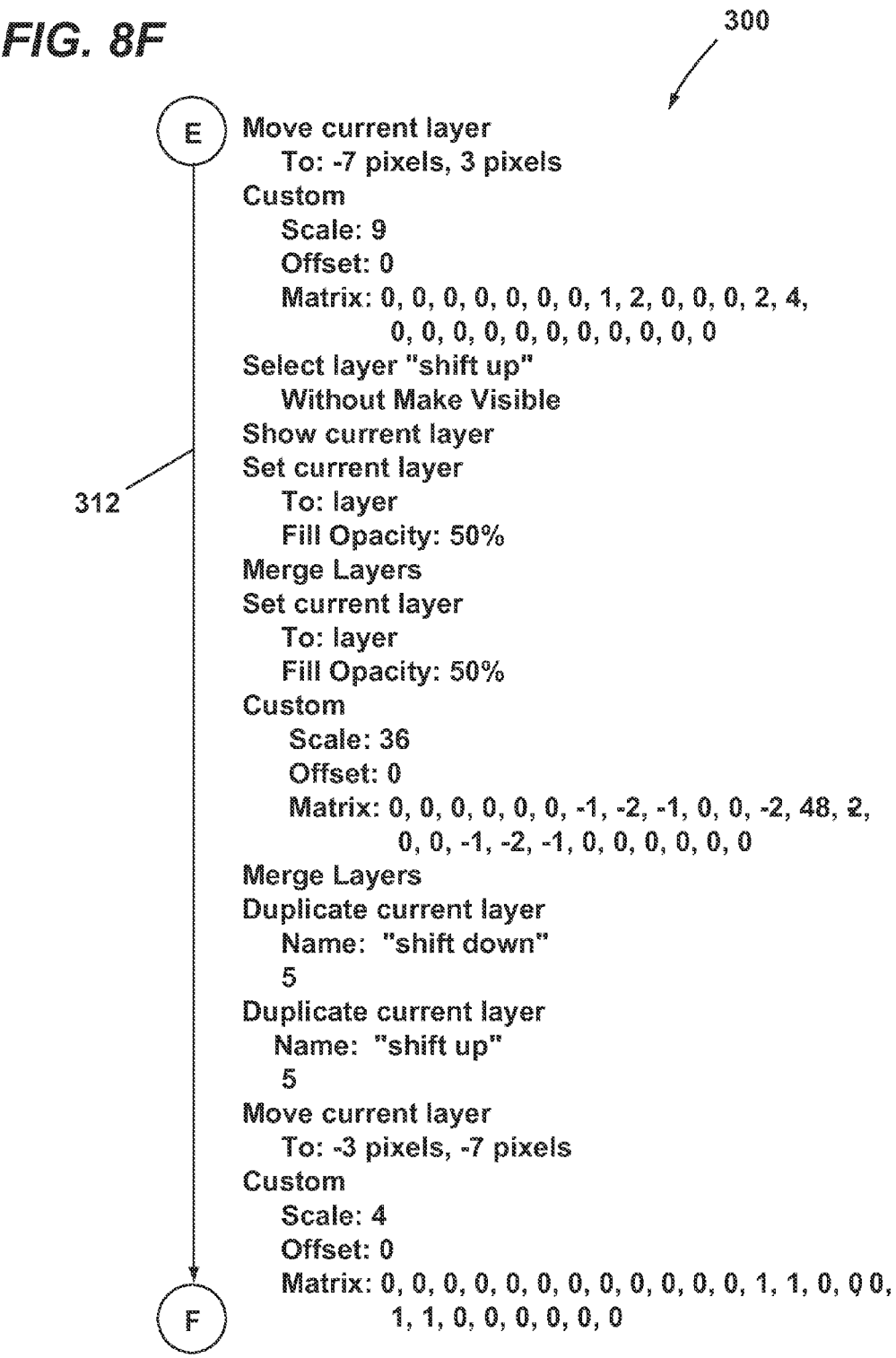

Referring to FIG. 3, an operation 302 is performed for generating a scanned image from a Dufay negative film. The Dufay negative film is an example of a color matrix film having a color grid overlying a silver film (i.e., a Reseau-enhanced panchromatic film). The scanned image includes a "Layer 0" that contains an RGB (Red-Green-Blue) component of the Dufay negative film with a 2.2 gamma. A layer above Layer 0 is referred to as the "Alpha Infrared Layer Image" and contains an infrared component with a 2.2 gamma. The 2.2 gamma parameter can be achieved through use of a plug-in utility (e.g., POWER plug-in for use with Adobe System's PHOTOSHOP CS6) that raises each pixel in a scanned image to the specified power (e.g., 1/0.4545=2.2 gamma). Such a plug-in can be written by anyone skilled in the art of writing Photoshop plug-ins. The scanned image has a suitable configuration such as, for example, 3112 pixels by 4096 pixels by 16-bit and a color (i.e., Reseau) grid having an angle of 23.5 degrees counter-clockwise at a size of 8×8 pixels. These scanned image parameters can be derived from a 4-channel raw unity gamma TIFF input, although in view of the disclosures made herein, a skilled person will appreciate that required processing to produce the scanned image may be different to match the format in which the color matrix film is scanned (e.g., modified/altered to account for positive/negative film, a different resolution, and/or other customization).

In FIGS. 4A-4D, an operation 304 is performed for computationally (e.g., digitally) separating the color (i.e., Reseau) grid from the underlying silver film. In preferred embodiments, computationally separating the color grid from the underlying silver film includes dividing (e.g., on a pixel-by-pixel basis—i.e., computationally dividing) the RGB image (e.g., a digital color copy from a scanning apparatus) containing silver and dye by the alpha infrared layer image (also referred to herein as the monochrome alpha image) containing substantially only the silver, thereby recovering substantially only the dye attributes (e.g., pattern, density, color, etc) of the color grid. The recovered color grid can be purified and normalized (i.e., a purified color grid image) such as by, for example, dividing (e.g., on a pixel-by-pixel basis) by the regional maximum of each color (sometimes referred to as "tracking ceiling"), placing under a forced decision where each pixel must be a specific full color, and then norming the color grid so that at any pixel a numeric value of Red pixel (R)+a numeric value of Green (G)+a numeric value of Blue (B)=1, which will be a useful characteristic in one or more subsequent operations of the method 300. In view of the disclosures made herein, a skilled person will appreciate there can be many possible variations of refinement after dividing by the infrared.

FIG. 5 shows an operation 306 for removing the repetitive pattern from the purified color grid image and applying the purified color grid image over the image in the silver film. Removing the repetitive pattern from the purified color grid image creates a resulting "color grid basis" image that has noise caused by imperfections in the placement and size of elements in the original color grid. Preferably, the repetitive pattern is removed in each axis such as, for example, through use of a boxcar blur that is matched to the size of the color grid, a suitably configured comb filter, or in the frequency domain using a Fast Fourier Transform (FFT). A "comb" filter is commonly used to isolate or remove a repetitive pattern. In the frequency domain, the response of a comb filter resembles a comb, with narrow tines combing out harmonic frequencies, hence the name. It is disclosed herein that a pattern removal technique such as application of a boxcar blur can be sequentially performed a plurality of times (e.g., twice), thereby effectively putting a double zero at the pattern frequency.

Applying the purified color grid image over the image in the silver film (i.e., the "alpha" infrared image) produces an "apply color grid" image. The apply color grid image is processed with the same boxcar filters to recover the color negative image without the grid pattern with variations in the brightness of the color grid removed by substituting a purified color grid image in place of the original color grid, resulting in the image being free of the color grid pattern. However, the original color grid has been blurred to remove its grid pattern. Furthermore, the image has color noise caused by imperfections in the placement and size of elements in the purified color grid image. Advantageously, the color grid basis image includes a record of the color noise, thereby allowing the removal that noise (i.e., noise suppression) by dividing "apply color grid" by "color grid basis" to produce an "apply color grid" image that exhibits greatly reduced color noise compared to the prior art image processing techniques.

Some defects in the color grid are larger than the pattern such that the technique used for removing the grid pattern (e.g., boxcar blur averaging) does not cover these defects. In such a case, color detail does not reach to the center of these relatively large defects and the previously implemented noise suppression undesirably attempts to divide by a number that approaches zero. FIGS. 6A-6C show an operation 308 for finding each these relatively large defects and filling them with color from a larger region around the respective one of the relatively large defects. In view of the disclosures made herein, a skilled person will appreciate other image processing techniques for mitigating effects of these relatively large defects and filling them with color from a larger region around the respective one of the relatively large defects.

At this point, the method 300 has produced an image that is substantially free of color noise, but that is blurred by the boxcar filters. High frequency detail can be obtained from the alpha infrared layer image and used to reduce blurring (e.g., removing the grid pattern from the alpha infrared layer image, adding the grid pattern from the alpha infrared layer image to the image, etc.). However, as a result of this, the grid pattern will be much more pronounced in areas of bright color, for example over a red dress the red cells predominate, causing a strong pattern that needs to be removed.

FIG. 7 shows an operation 310 for reducing these pronounced color grid patterns in areas of bright color. First the purified color grid image is added back over the monochrome alpha image. Remembering that the purified color grid image has been purified such that numeric values R+G+B always=1 (as discussed above in reference to FIGS. 4A-4D), the monochrome alpha image can be recovered by adding the numeric values R+G+B. Next, this image is divided (e.g., on a pixel-by-pixel basis) by the noise-free but blurred "apply color grid" image to produce a "detail" image. It is disclosed herein that the "detail" image divides out the lower frequencies present in the "apply color grid" image, leaving precisely only the high frequency detail that was not in the "apply color grid" image. Furthermore, the colors are normed out so that, for example, in an area over a red dress where red cells predominate, the green and blue cells are given extra weight to greatly reduce the color grid pattern. Finally, adding the numeric values R+G+B gives the high frequency detail missing in the "apply color grid" image plus a residual color grid pattern.

FIGS. 8A-8G show an operation 312 for reducing these pronounced color grid patterns in areas of bright color. A comb filter is built by adding multiple shifts keyed to the size of the color grid and then repeating the process to extend a width of the comb filter. After the residue of the color grid in the "detail" image is separated out in the "comb" image, the comb image is subtracted (i.e., on a pixel-by-pixel basis—i.e., computationally subtracting) from the "detail" image, thereby leaving the residue monochrome detail image free of almost all of the effects of the color grid (i.e., a color grid effect-modified monochrome image). Embodiments of the present invention advantageously provide for this comb image, the details in which have not been visible and thus available for utilization in prior art image restoration techniques of Dufay and other similarly configured films.

Figure 10A:
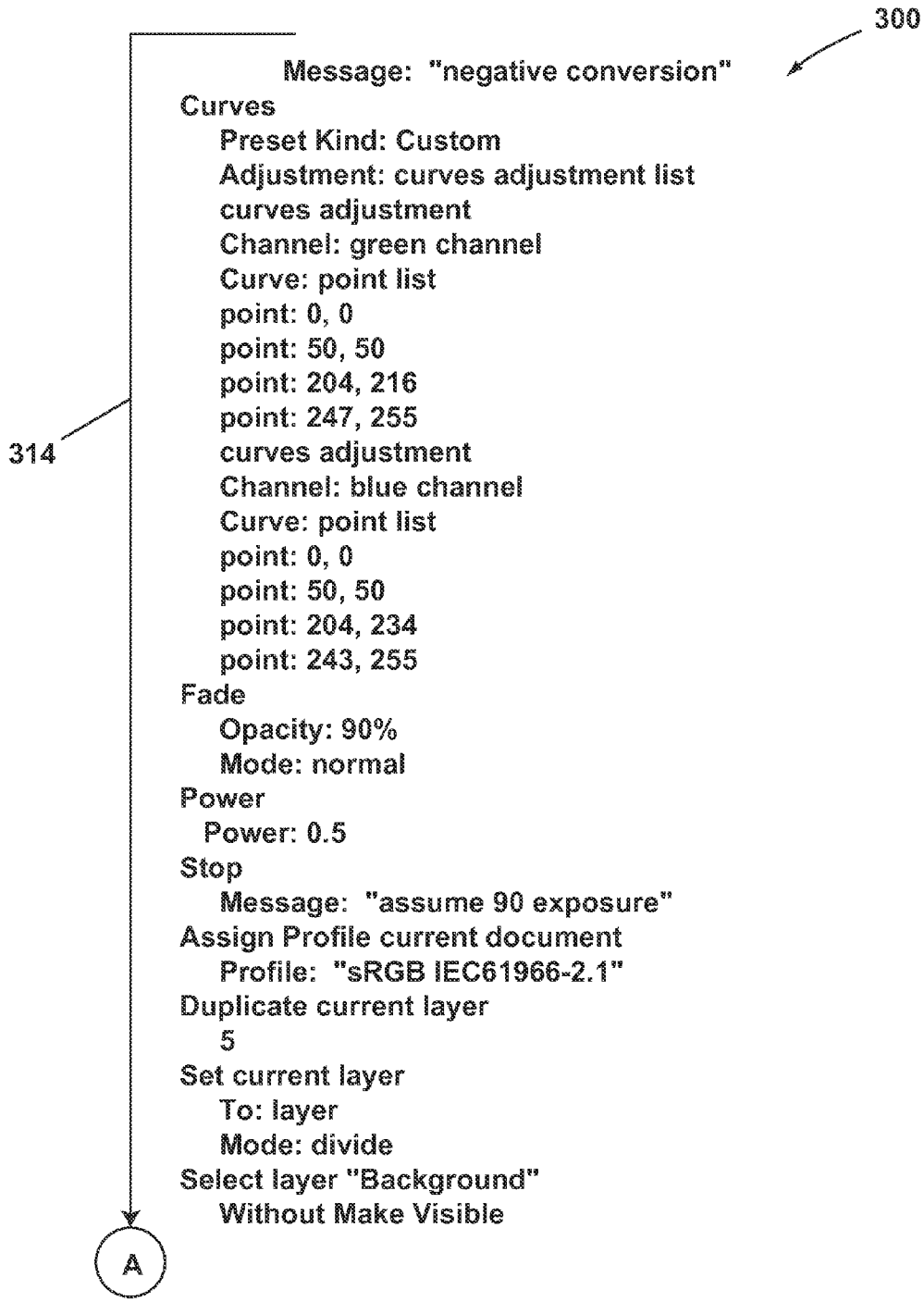
FIGS. 10A-10C is a block diagram showing an operation configured in accordance with an embodiment of the present invention for converting a negative image to a finished positive image.
Figure 10B:
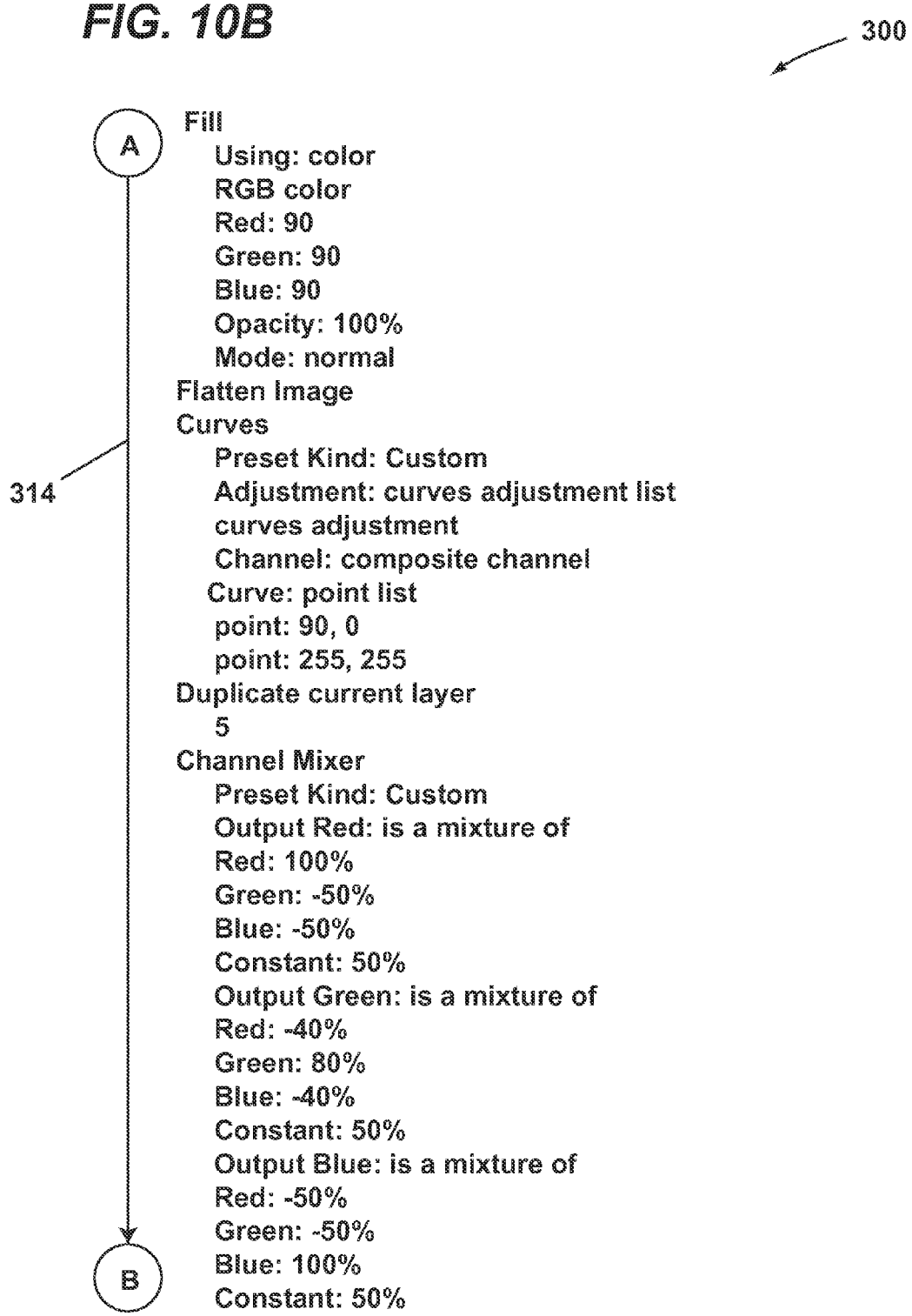
Figure 10C:
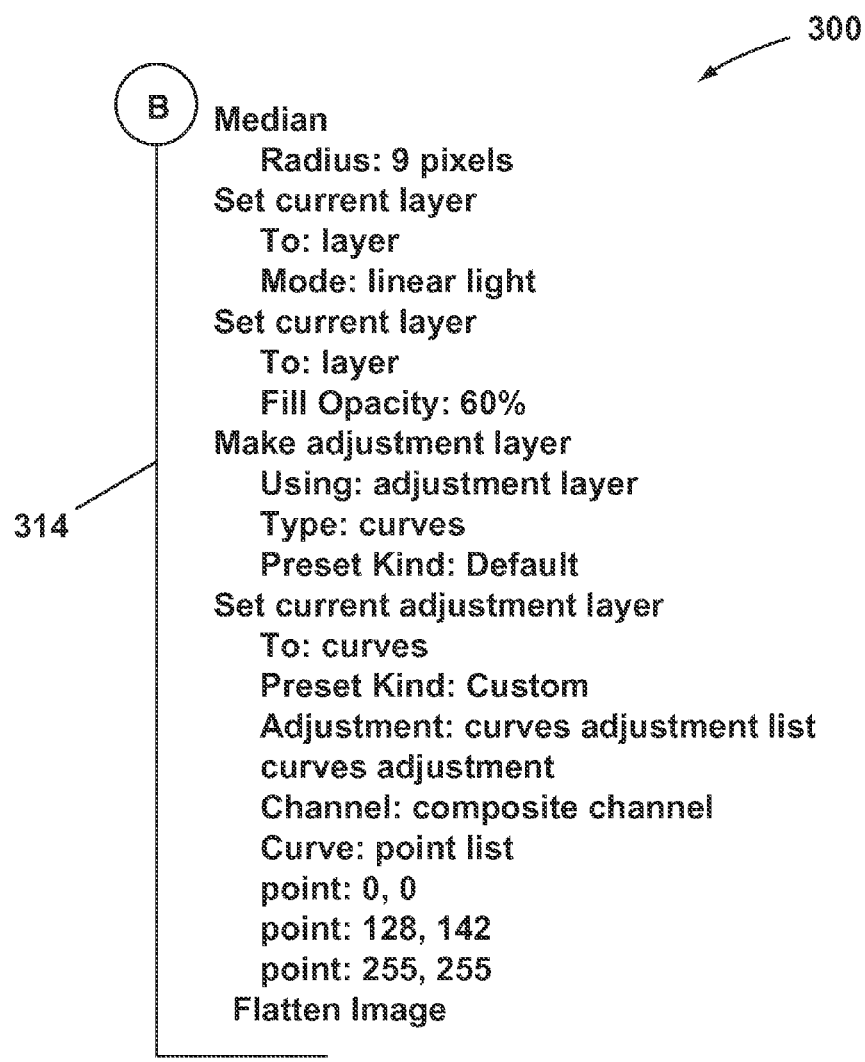

An operation 314 for combining (i.e., adding on a pixel-by-pixel basis—i.e., computationally adding) the "Apply color grid" image and the "Detail" image is shown in FIG. 9 and an operation 316 for converting the negative image to a finished positive is shown in FIGS. 10A-10C. In preferred embodiments, the "Apply color grid" image is an image with the resolution of best prior art practice, but with greatly reduced color noise and the "Detail" image holds fine detail not available in the prior art, but the detail is in monochrome. The image (i.e., sum) resulting from adding the "Apply color grid" image and the "Detail" image has higher luminance resolution than color resolution, which matches the human eye, and is used to advantage in image processing protocols such as JPEG, MPEG, the old NTSC television, and Bayer arrays in digital cameras, which all of which have higher luminance resolution than color resolution.

Some embodiments of the present invention can be or include a non-transitory computer-readable medium having tangibly embodied thereon and accessible therefrom processor-interpretable information defining a displayable visual experience (e.g., a movie, picture, or other visually-perceivable artifact). For example, a displayable visual experience in the form of a picture comprises a digital image generated by subjecting an original image on a color matrix film to an image processing method configured in accordance with the present invention (e.g., the image processing method 300 discussed above in reference to FIGS. 3-10C) to produce the processor-interpretable information. For example, an image on a color matrix film can be digitally rendered by a scanner (e.g., a film scanner) configured for subjecting an image scanned thereby to a image processing method configured in accordance with the present invention (e.g., non-transitory computer-readable medium configured in accordance with an embodiment of the present invention is integrated into the scanner) to produce such processor-interpretable information. The processor-interpretable information can be interpreted by a data processor of a digital media playback system (e.g., a data processing apparatus (e.g., computer)) with one or more corresponding images defined by such processor-interpretable information being outputted to a visual display. In one embodiment, the non-transitory computer-readable medium includes a memory device and a memory device interface (e.g., data access port) coupled thereto. The processor-interpretable information is tangibly embodied on (i.e., stored on) the memory device and is accessible therefrom via the memory device interface.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A method performed by an image processing apparatus, comprising:
    scanning a color matrix film with visible light to generate a digital color copy thereof;
    scanning the color matrix film with infrared light to generate an infrared alpha layer image thereof;
    separating a color grid of the color matrix film from an underlying silver layer of the color matrix film to produce a color grid image, wherein separating the color grid from the underlying silver layer includes computationally dividing the digital color copy of the image by the infrared alpha layer image; and
    using the color grid image to generate an altered version of the digital color copy, wherein using the color grid image to generate the altered version of the digital color copy includes laying the color grid image over the infrared alpha layer image to produce an apply color grid image, applying a pattern removal technique to the apply color grid image to produce a grid-pattern-reduced apply color grid image, applying the pattern removal technique to the color grid image to produce a color grid basis image, and computationally dividing the grid-pattern-reduced apply color grid image by the color grid basis image to remove adverse effect of color grid from the grid-pattern-reduced apply color grid image.

2. The method of claim 1, further comprising:
    normalizing the color grid image as a function of a regional maximum of each color of the color grid.

3. The method of claim 1, further comprising:
    determining a color of each pixel of the color grid image; and
    normalizing the color grid image whereby at any pixel a relative value for each one of a red color component, a green color component and a blue color component sums to a common specified value.

4. The method of claim 1 wherein using the color grid image to generate the altered version of the digital color copy includes:
    determining variations in at least one parameter defining the color grid;
    determining an effect that the variations have on the digital color copy; and
    removing at least a portion of the effect of the variations from the infrared alpha layer image.

5. The method of claim 1, further comprising:
    normalizing the color grid image as a function of a regional maximum of each color of the color grid;
    determining a color of each pixel of the color grid image; and
    normalizing the color grid image whereby at any pixel a relative value for each one of a red color component, a green color component and a blue color component sums to a common specified value.

6. The method of claim 5 wherein using the color grid image to generate the altered version of the digital color copy includes:
    determining variations in at least one parameter defining the color grid image;
    determining an effect that the variations have on the digital color copy; and
    removing at least a portion of the effect of the variations from the infrared alpha layer image.

7. The method of claim 1 wherein using the color grid to generate the altered version of the digital color copy includes computationally dividing the apply color grid image by the grid-pattern-reduced apply color grid image to produce a detail image.

8. The method of claim 7 wherein using the color grid to generate the altered version of the digital color copy includes:
    applying a comb filer to the detail image to produce a comb image; and
    computationally subtracting the comb image from the detail image to produce a color grid effect-modified monochrome image.

9. A device, comprising:
    a non-transitory computer-readable medium having tangibly embodied thereon and accessible therefrom processor-interpretable information defining a visual image, wherein the processor-interpretable information has been generated using a method comprising:
        scanning a color matrix film with visible light to generate a digital color copy thereof;
        scanning the color matrix film with infrared light to generate an infrared alpha layer image thereof;
        separating a color grid of the color matrix film from an underlying silver layer of the color matrix film to produce a color grid image, wherein separating the color grid from the underlying silver layer includes computationally dividing the digital color copy of the image by the infrared alpha layer image; and
        using the color grid image to generate an altered version of the digital color copy, wherein using the color grid image to generate the altered version of the digital color copy includes laying the color grid image over the infrared alpha layer image to produce an apply color grid image, applying a pattern removal technique to the apply color grid image to produce a grid-pattern-reduced apply color grid image, applying the pattern removal technique to the color grid image to produce a color grid basis image, and computationally dividing the grid-pattern-reduced apply color grid image by the color grid basis image to remove adverse effect of color grid from the grid-pattern-reduced apply color grid image.

10. The device of claim 9 wherein using the color grid image to generate the altered version of the digital color copy includes:
   determining variations in at least one parameter defining the color grid;
   determining an effect that the variations have on the digital color copy; and
   removing at least a portion of the effect of the variations from the infrared alpha layer image.

11. The device of claim 9, further comprising:
   normalizing the color grid image as a function of a regional maximum of each color of the color grid;
   determining a color of each pixel of the color grid image; and
   normalizing the color grid image whereby at any pixel a relative value for each one of a red color component, a green color component and a blue color component sums to a common specified value.

12. The device of claim 11 wherein using the color grid image to generate the altered version of the digital color copy includes:
   determining variations in at least one parameter defining the color grid image;
   determining an effect that the variations have on the digital color copy; and
   removing at least a portion of the effect of the variations from the infrared alpha layer image.

13. The device of claim 9 wherein using the color grid to generate the altered version of the digital color copy includes computationally dividing the apply color grid image by the grid-pattern-reduced apply color grid image to produce a detail image.

14. The device of claim 13 wherein using the color grid to generate the altered version of the digital color copy includes:
   applying a comb filer to the detail image to produce a comb image; and computationally subtracting the comb image from the detail image to produce a color grid effect-modified monochrome image.

15. An image processing apparatus, comprising:
   a non-transitory computer-readable medium having accessible therefrom instructions defining an image processing method; and
   at least one processor coupled to the non-transitory computer-readable medium for accessing and executing the instructions defining the image processing method, wherein executing the instructions defining the image processing method includes:
   scanning a color matrix film with visible light to generate a digital color copy thereof;
   scanning the color matrix film with infrared light to generate an infrared alpha layer image thereof;
   separating a color grid of the color matrix film from an underlying silver layer of the color matrix film to produce a color grid image, wherein separating the color grid from the underlying silver layer includes computationally dividing the digital color copy of the image by the infrared alpha layer image; and
   using the color grid image to generate an altered version of the digital color copy, wherein using the color grid image to generate the altered version of the digital color copy includes laying the color grid image over the infrared alpha layer image to produce an apply color grid image, applying a pattern removal technique to the apply color grid image to produce a grid-pattern-reduced apply color grid image, applying the pattern removal technique to the color grid image to produce a color grid basis image, and computationally dividing the grid-pattern-reduced apply color grid image by the color grid basis image to remove adverse effect of color grid from the grid-pattern-reduced apply color grid image.

16. The image processing apparatus of claim 15 wherein using the color grid to generate the altered version of the digital color copy includes computationally dividing the apply color grid image by the grid-pattern-reduced apply color grid image to produce a detail image.

17. The image processing apparatus of claim 16 wherein using the color grid to generate the altered version of the digital color copy includes:
   applying a comb filer to the detail image to produce a comb image; and
   computationally subtracting the comb image from the detail image to produce a color grid effect-modified monochrome image.

* * * * *